United States Patent
Yamashita

(10) Patent No.: US 9,869,501 B2
(45) Date of Patent: Jan. 16, 2018

(54) AIR-CONDITIONING APPARATUS

(71) Applicant: Koji Yamashita, Tokyo (JP)

(72) Inventor: Koji Yamashita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 14/655,363

(22) PCT Filed: Mar. 12, 2013

(86) PCT No.: PCT/JP2013/056712
§ 371 (c)(1),
(2) Date: Jun. 25, 2015

(87) PCT Pub. No.: WO2014/141373
PCT Pub. Date: Sep. 18, 2014

(65) Prior Publication Data
US 2015/0354878 A1 Dec. 10, 2015

(51) Int. Cl.
*F25B 49/02* (2006.01)
*F25B 31/00* (2006.01)
(Continued)

(52) U.S. Cl.
CPC .............. *F25B 49/022* (2013.01); *F25B 1/10* (2013.01); *F25B 13/00* (2013.01); *F25B 31/008* (2013.01);
(Continued)

(58) Field of Classification Search
CPC .......... F25B 1/10; F25B 13/00; F25B 31/008; F25B 40/00; F25B 41/003; F25B 41/062;
(Continued)

(56) References Cited

U.S. PATENT DOCUMENTS

2006/0277931 A1\* 12/2006 Nakamura ............ F04C 27/005
62/196.1
2011/0023514 A1\* 2/2011 Mitra ........................ F25B 1/10
62/222

FOREIGN PATENT DOCUMENTS

JP 02-110255 A 4/1990
JP 03-105156 A 5/1991
(Continued)

OTHER PUBLICATIONS

Extended European Search Report dated Sep. 15, 2016 issued in corresponding EP patent application No. 3878217.
(Continued)

*Primary Examiner* — Marc Norman
(74) *Attorney, Agent, or Firm* — Posz Law Group, PLC

(57) ABSTRACT

An air-conditioning apparatus includes: a first bypass pipe connected to an inlet-side passage of an accumulator through a second expansion device, a second passage of a subcooling heat exchanger, and a first opening and closing device; a second bypass pipe branched from the first bypass pipe between the subcooling heat exchanger and the first opening and closing device and connected to an injection port of a compressor through a second opening and closing device; and a third bypass pipe branched from a refrigerant pipe between a heat source-side heat exchanger and a use-side heat exchanger and connected to the second bypass pipe between the second opening and closing device and the injection port of the compressor through a third expansion device.

14 Claims, 6 Drawing Sheets

(51) Int. Cl.
*F25B 41/00* (2006.01)
*F25B 41/06* (2006.01)
*F25B 13/00* (2006.01)
*F25B 1/10* (2006.01)
*F25B 40/00* (2006.01)

(52) U.S. Cl.
CPC .............. *F25B 40/00* (2013.01); *F25B 41/003* (2013.01); *F25B 41/062* (2013.01); *F25B 2313/006* (2013.01); *F25B 2313/0233* (2013.01); *F25B 2313/02741* (2013.01); *F25B 2313/0314* (2013.01); *F25B 2400/13* (2013.01); *F25B 2400/23* (2013.01); *F25B 2600/2501* (2013.01); *F25B 2600/2509* (2013.01); *F25B 2700/1931* (2013.01); *F25B 2700/1933* (2013.01); *F25B 2700/2101* (2013.01); *F25B 2700/21152* (2013.01)

(58) Field of Classification Search
CPC .............. F25B 49/022; F25B 2313/006; F25B 2313/0233; F25B 2313/02741; F25B 2313/0314; F25B 2400/13; F25B 2400/23; F25B 2600/2501; F25B 2600/2509; F25B 2700/1931; F25B 2700/1933; F25B 2700/2101; F25B 2700/21152
See application file for complete search history.

(56) References Cited

FOREIGN PATENT DOCUMENTS

| | | |
|---|---|---|
| JP | 2001-227823 A | 8/2001 |
| JP | 2005-282972 A | 10/2005 |
| JP | 2008-180420 A | 8/2008 |
| JP | 2008-215697 A | 9/2008 |
| JP | 2009-270822 A | 11/2009 |
| JP | 2010-071614 A | 4/2010 |
| WO | 2012/104891 A1 | 8/2012 |
| WO | 2012/104893 A1 | 8/2012 |
| WO | 2013/001572 A1 | 1/2013 |

OTHER PUBLICATIONS

Office Action dated Nov. 10, 2015 in the corresponding JP application No. 2015-505114 (with English translation).
International Search Report of the International Searching Authority dated Jun. 18, 2013 for the corresponding international application No. PCT/JP2013/053712 (and English translation).
Office Action dated Jun. 24, 2016 in the corresponding CN patent application No. 201380073675.2 (with English translation).

* cited by examiner

AIR-CONDITIONING APPARATUS

CROSS REFERENCE TO RELATED APPLICATION

This application is a U.S. national stage application of International Application No. PCT/JP2013/056712 filed on Mar. 12, 2013, the disclosure of which is incorporated by reference.

TECHNICAL FIELD

The present invention relates to an air-conditioning apparatus to be applied to, for example, a multi-air-conditioning apparatus for a building.

BACKGROUND ART

When an air-conditioning apparatus such as a multi-air-conditioning apparatus for a building performs a heating operation under low outside air temperature, a discharge temperature of a compressor is excessively high, and hence frequency of the compressor cannot be increased, with the result that required heating capacity cannot be exerted. Further, when a refrigerant such as R32 is used, the discharge temperature of the compressor is excessively high even during a high-outside air cooling operation. Therefore, it is necessary to lower the discharge temperature of the compressor so that an amount of heat corresponding to a load may be supplied. To lower the discharge temperature of the compressor, there is given an air-conditioning apparatus capable of controlling the discharge temperature to a set temperature irrespective of an operation state including a circuit for performing liquid injection to the middle of the compressor from a high-pressure liquid pipe of a refrigeration cycle (for example, Patent Literature 1).

Further, there is given an air-conditioning apparatus capable of injecting high-pressure liquid refrigerant of the refrigeration cycle to a suction side of the compressor in both of the cooling operation and the heating operation (for example, Patent Literature 2).

Still further, there is given an air-conditioning apparatus including a subcooling heat exchanger on an outlet side of a condenser, and being configured to control a flow rate of refrigerant to be controlled to flow through the subcooling heat exchanger, thereby controlling the discharge temperature of the compressor (for example, Patent Literature 3).

CITATION LIST

Patent Literature

Patent Literature 1: Japanese Unexamined Patent Application Publication No. 2005-282972 (Page 4, FIG. 1, etc.)
Patent Literature 2: Japanese Unexamined Patent Application Publication No. Hei 2-110255 (Page 3, FIG. 1, etc.)
Patent Literature 3: Japanese Unexamined Patent Application Publication No. 2001-227823 (Page 4, FIG. 1, etc.)

SUMMARY OF INVENTION

Technical Problems

In the air-conditioning apparatus disclosed in Patent Literature 1, there is only described a method of injection to the middle of the compressor from the high-pressure liquid pipe, thus leading to a problem in that the air-conditioning apparatus is not capable of handling, for example, a case where a circulation path of the refrigeration cycle is reversed (the cooling and the heating are switched).

In the air-conditioning apparatus disclosed in Patent Literature 2, check valves are installed in parallel to expansion devices on both of the indoor side and the outdoor side, and hence the liquid refrigerant can be sucked and injected in both of the cooling and the heating. To achieve such an operation, however, a special indoor unit is required but a general indoor unit having check valves not connected in parallel to the expansion devices cannot be used, thus leading to a problem in that the configuration is not a general configuration.

In the air-conditioning apparatus disclosed in Patent Literature 3, an expansion device arranged together with the subcooling heat exchanger controls the flow rate of the refrigerant to be controlled to flow through the subcooling heat exchanger, thereby controlling the discharge temperature. Therefore, both of the discharge temperature and a degree of subcooling at the outlet of the condenser cannot be controlled to target values individually, with the result that the discharge temperature cannot appropriately be controlled while maintaining an appropriate degree of subcooling. Thus, when an extension pipe connecting the outdoor unit and the indoor unit is long, the control of the discharge temperature to the target value may hinder the control of the degree of subcooling at the outlet of the outdoor unit to the target value. Consequently, the refrigerant flowing into the indoor unit may be turned into two-phase refrigerant due to pressure loss occurring at the extension pipe. Therefore, when the expansion device is arranged in the indoor unit as in the case of the multi-air-conditioning apparatus or the like, the two-phase refrigerant generated on an inlet side of the expansion device may result in a problem of noise or unstable control.

The present invention has been made to solve problems described above, and it is therefore a first object of the present invention to provide an air-conditioning apparatus capable of maintaining, to an appropriate value, a degree of subcooling of refrigerant flowing out of an outdoor unit during a cooling operation while controlling a discharge temperature of a compressor to an appropriate temperature during both of the cooling operation and a heating operation, and also capable of controlling the refrigerant to flow into an indoor unit in a liquid refrigerant state even when an extension pipe is long, thereby achieving stable control. Further, it is a second object of the present invention to provide an air-conditioning apparatus capable of lowering the discharge temperature of the compressor and exerting required heating capacity in the heating operation under low outside air temperature.

Solution to Problems

According to Embodiment of the present invention, there is provided an air-conditioning apparatus, including: a refrigeration cycle for circulating refrigerant therethrough, in which a compressor, a first heat exchanger, a first passage of a subcooling heat exchanger for exchanging heat between high-temperature refrigerant and low-temperature refrigerant to subcool the high-temperature refrigerant, a first expansion device, and a second heat exchanger are connected to each other by refrigerant pipes, the compressor including an injection port for introducing the refrigerant from outside into a compression chamber of the compressor; a first bypass pipe branched from one of the refrigerant pipes between the first heat exchanger and the second heat exchanger and connected to an inlet-side passage of the compressor through a second expansion device, a second passage of the subcooling heat exchanger for exchanging heat between the refrigerant flowing through the second passage of the subcooling heat exchanger and the refrigerant flowing through the first passage of the subcooling heat exchanger, and a first opening and closing device; a second bypass pipe branched from the first bypass pipe between the subcooling heat exchanger and the first opening and closing device and connected to the injection port of the compressor through a second opening and closing device; and a third bypass pipe branched from the one of the refrigerant pipes between the first heat exchanger and the second heat exchanger and connected to the injection port of the compressor through a third expansion device.

Advantageous Effects of Invention

The air-conditioning apparatus according to Embodiment of the present invention is capable of preventing excessive increase in discharge temperature of the compressor in both of the cooling operation and the heating operation. Thus, according to the air-conditioning apparatus of Embodiment of the present invention, it is possible to prevent damage to the compressor, extend the life of the compressor, and to exert required heating capacity in the heating operation under low outside air temperature.

DESCRIPTION OF EMBODIMENT

Figure 1:
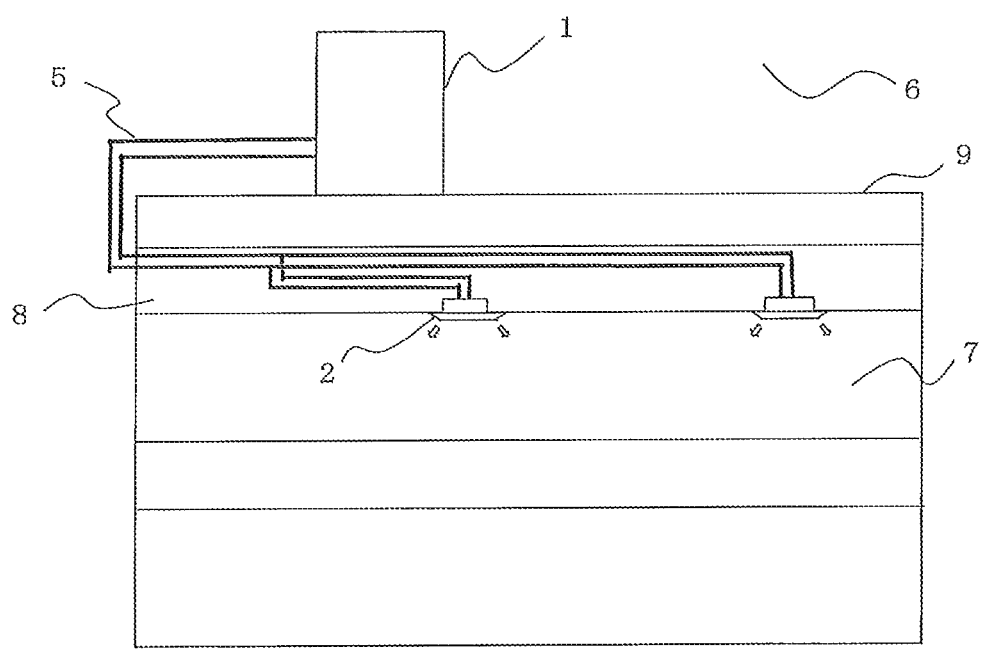
FIG. 1 is a schematic diagram illustrating an example of installation of an air-conditioning apparatus according to Embodiment 1 of the present invention.

Now, Embodiment of the present invention is described referring to the drawings. Note that, in the drawings referred to below including FIG. 1, the size relationship between components may be different from the reality in some cases. Further, in the drawings referred to below including FIG. 1, the same or corresponding parts are represented by the same reference symbols, and the same applies hereinafter. Further, the forms of the constituent elements described herein are only examples and the present invention is not limited to the forms thus described.

FIG. 1 is a schematic diagram illustrating an example of installation of an air-conditioning apparatus according to Embodiment of the present invention. Referring to FIG. 1, the example of installation of the air-conditioning apparatus is described. This air-conditioning apparatus is capable of selecting any one of a cooling mode and a heating mode as an operation mode by utilizing a refrigeration cycle for circulating refrigerant.

In FIG. 1, the air-conditioning apparatus according to the present Embodiment includes one outdoor unit 1 serving as a heat source apparatus, and a plurality of indoor units 2. The outdoor unit 1 and the indoor units 2 are connected to each other by extension pipes (refrigerant pipes) 5 through which refrigerant is conveyed. Cooling energy or heating energy generated by the outdoor unit 1 is delivered to the indoor units 2.

The outdoor unit 1 is generally arranged in an outdoor space 6, which is a space outside of a structure 9 such as a building (for example, on a rooftop), and supplies the cooling energy or heating energy to the indoor units 2. The indoor units 2 are arranged at positions at which temperature-adjusted air can be supplied to an indoor space 7 as a space inside the structure 9 (for example, residential room), and supply cooling air or heating air to the indoor space 7 as an air-conditioned space.

As illustrated in FIG. 1, in the air-conditioning apparatus according to the present Embodiment, the outdoor unit 1 and each of the indoor units 2 are connected by the two extension pipes 5.

Note that, FIG. 1 illustrates an example of a case where the indoor unit 2 is a ceiling cassette type indoor unit, but the present invention is not limited thereto. Any types of the indoor unit such as a ceiling-concealed indoor unit or a ceiling-suspended indoor unit may be adopted as long as heating air or cooling air can be blown into the indoor space 7 directly or through a duct or the like.

FIG. 1 illustrates as an example a case where the outdoor unit 1 is installed in the outdoor space 6, but the present invention is not limited thereto. For example, the outdoor unit 1 may be installed in an enclosed space such as a machine room with a ventilation port, or may be installed inside the structure 9 as long as waste heat is exhaustible to the outside of the structure 9 through an exhaust duct. Alternatively, when a water-cooled outdoor unit 1 is adopted, the outdoor unit 1 may be installed inside the structure 9. No particular problem may arise even if the outdoor unit 1 is installed at any place.

Further, the numbers of the outdoor units 1 and the indoor units 2 to be connected are not limited to the numbers as illustrated in FIG. 1, but may be determined depending on the structure 9 in which the air-conditioning apparatus according to the present Embodiment is installed.

Figure 2:
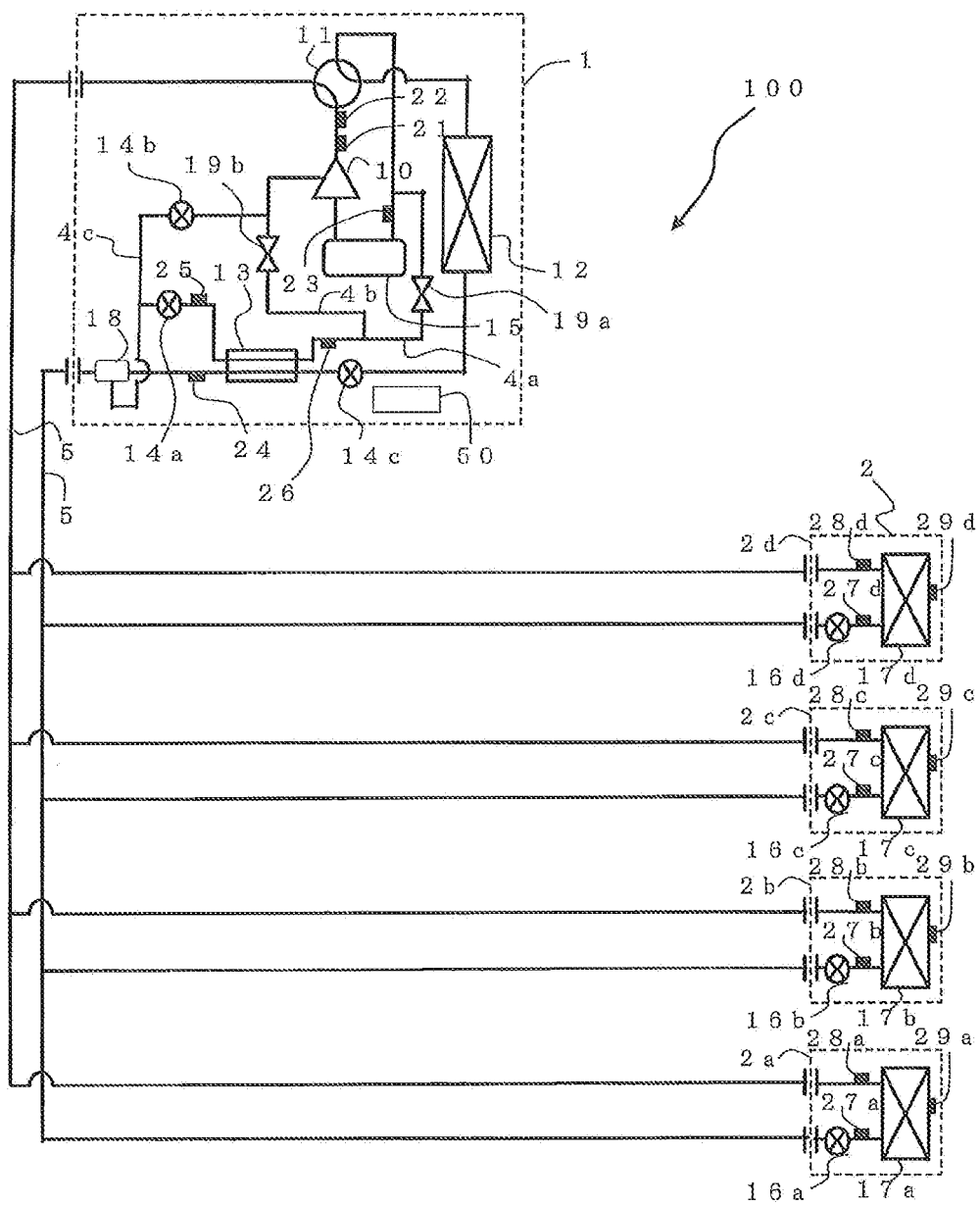
FIG. 2 is a schematic circuit configuration diagram illustrating an example of a circuit configuration of the air-conditioning apparatus according to Embodiment 1 of the present invention.

FIG. 2 is a schematic circuit configuration diagram illustrating an example of a circuit configuration of the air-conditioning apparatus according to the present Embodiment (hereinafter referred to as "air-conditioning apparatus 100"). Referring to FIG. 2, a detailed configuration of the air-conditioning apparatus 100 is described. As illustrated in FIG. 2, the outdoor unit 1 and the indoor units 2 are connected to each other by the extension pipes 5.

[Outdoor Unit 1]

In the outdoor unit 1, a compressor 10, a refrigerant flow switching device 11 such as a four-way valve, a heat source-side heat exchanger 12, and an accumulator 15 are mounted in a serial connection by the refrigerant pipes. Further, the outdoor unit 1 includes a first bypass pipe 4a, a second bypass pipe 4b, a third bypass pipe 4c, an expansion device 14a, an expansion device 14b, an expansion device 14c, an opening and closing device 19a, an opening and closing device 19b, a subcooling heat exchanger 13, and a liquid separator 18.

The compressor 10 sucks the refrigerant, and compresses the refrigerant into a high-temperature and high-pressure state. The compressor 10 may be a capacity-controllable inverter compressor or the like. Note that, in a side surface of a compression chamber for compressing refrigerant inside the compressor 10, there is formed an injection port through which refrigerant can be introduced from the outside of the compressor 10 to the inside of the compression chamber.

Further, as the compressor 10, for example, it is only necessary to use a compressor having a low-pressure shell structure, in which a compression chamber is formed inside a hermetic container that is under a low-refrigerant pressure atmosphere, and low-pressure refrigerant inside the hermetic container is sucked into the compression chamber to compress the refrigerant.

In addition, the second bypass pipe 4b is connected to the injection port of the compressor 10.

The refrigerant flow switching device 11 switches a flow of the refrigerant during a heating operation and a flow of the refrigerant during a cooling operation.

The heat source-side heat exchanger 12 functions as an evaporator during the heating operation and functions as a condenser (or a radiator) during the cooling operation, and exchanges heat between air supplied from a fan (not shown) and the refrigerant, thereby evaporating and gasifying the refrigerant or condensing and liquefying the refrigerant.

The accumulator 15 is arranged on a suction side of the compressor 10, and accumulates surplus refrigerant in the refrigerant circuit.

The first bypass pipe 4a connects the third bypass pipe 4c located on an upstream side of the expansion device 14b and the refrigerant pipe located on an upstream side of the accumulator 15 through the expansion device 14a, the subcooling heat exchanger 13, and the opening and closing device 19a. During the cooling operation, the refrigerant condensed and liquefied by the condenser (heat source-side heat exchanger 12) is decompressed by a function of the expansion device 14a, and then the first bypass pipe 4a bypasses the refrigerant to the upstream side of the accumulator 15 through the subcooling heat exchanger 13 and the opening and closing device 19a as low-pressure superheated gas refrigerant.

The second bypass pipe 4b connects the first bypass pipe 4a located between the subcooling heat exchanger 13 and the opening and closing device 19a and the injection port formed in the compression chamber of the compressor 10 through the opening and closing device 19b. To enhance the heating capacity in the heating operation under low outside air temperature, first intermediate-pressure liquid refrigerant separated by the liquid separator 18 is decompressed by the function of the expansion device 14a, and then the second bypass pipe 4b injects the refrigerant into the compression chamber of the compressor 10 through the subcooling heat exchanger 13 and the opening and closing device 19b as two-phase refrigerant having a second intermediate pressure lower than the first intermediate pressure and also having high quality.

The third bypass pipe 4c connects the liquid separator 18 and the second bypass pipe 4b located between the opening and closing device 19b and the compressor 10 through the expansion device 14b. During the cooling operation and the heating operation, high-pressure or first intermediate-pressure liquid refrigerant is decompressed by a function of the expansion device 14b, and the refrigerant is injected into the compression chamber of the compressor 10 through the third bypass pipe 4c as two-phase refrigerant having the second intermediate pressure lower than the first intermediate pressure and also having low quality.

The expansion device 14a functions as a pressure reducing valve or an expansion valve, and expands the refrigerant through decompression. The expansion device 14a is installed in the first bypass pipe 4a on an upstream side of the subcooling heat exchanger 13. The expansion device 14a only needs to be a device capable of variably controlling its opening degree, such as an electronic expansion valve.

The expansion device 14b functions as a pressure reducing valve or an expansion valve, and expands the refrigerant through decompression. The expansion device 14b is installed in the third bypass pipe 4c. The expansion device 14b only needs to be a device capable of variably controlling its opening degree, such as an electronic expansion valve.

The expansion device 14c functions as a pressure reducing valve or an expansion valve, and expands the refrigerant through decompression. The expansion device 14c is installed in the refrigerant pipe located between the heat source-side heat exchanger 12 and the liquid separator 18. The expansion device 14c only needs to be a device capable of variably controlling its opening degree, such as an electronic expansion valve.

The opening and closing device 19a is a two-way valve, a solenoid valve, an electronic expansion valve, or the like and opens and closes the first bypass pipe 4a. The opening and closing device 19a is arranged in the first bypass pipe 4a on a downstream side of the subcooling heat exchanger 13.

The opening and closing device 19b is a two-way valve, a solenoid valve, an electronic expansion valve, or the like and opens and closes the second bypass pipe 4b. The opening and closing device 19b is arranged in the second bypass pipe 4b.

The subcooling heat exchanger 13 is, for example, a double-pipe heat exchanger and exchanges heat between the refrigerant passing through the refrigerant pipe located between the expansion device 14c and the liquid separator 18 and the refrigerant passing through the first bypass pipe 4a located between the expansion device 14a and the opening and closing device 19a. Note that, the subcooling heat exchanger 13 is not limited to the double-pipe heat exchanger, but may have any structure as long as the subcooling heat exchanger 13 is capable of exchanging heat between the refrigerant passing through the first bypass pipe 4a and the refrigerant passing through the refrigerant pipe ranging from the heat source-side heat exchanger 12 to an outlet of the outdoor unit 1 during the cooling operation.

The liquid separator 18 separates liquid refrigerant from the refrigerant flowing through the refrigerant pipe. The third bypass pipe 4c is connected to the liquid separator 18.

Note that, the first intermediate pressure refers to a pressure lower than a high pressure on a discharge side of the compressor 10 and higher than the second intermediate pressure that is a pressure on a downstream side of the second bypass pipe 4b and at the injection port of the compression chamber of the compressor 10.

In addition, the second intermediate pressure refers to a pressure lower than the first intermediate pressure and also the pressure on the downstream side of the second bypass pipe 4b and at the injection port of the compression chamber of the compressor 10.

Moreover, the outdoor unit 1 includes various detection devices (discharge refrigerant temperature detection device 21, high-pressure detection device 22, low-pressure detection device 23, liquid refrigerant temperature detection device 24, subcooling heat exchanger inlet refrigerant temperature detection device 25, and subcooling heat exchanger outlet refrigerant temperature detection device 26). Information pieces detected by those detection devices (temperature information and pressure information) are transmitted to a controller 50 arranged in the outdoor unit 1, and are used for controlling driving frequency of the compressor 10, switching of the refrigerant flow switching device 11, an opening degree of the expansion device 14a, an opening degree of the expansion device 14b, an opening degree of the expansion device 14c, a rotation speed of the fan (not shown) for blowing air to the heat source-side heat exchanger 12, opening and closing of the opening and closing device 19a, opening and closing of the opening and closing device 19b, and the like.

The discharge refrigerant temperature detection device 21 is arranged in a discharge passage of the compressor 10, and detects a temperature of refrigerant discharged from the compressor 10. The discharge refrigerant temperature detection device 21 only needs to be, for example, a thermistor.

The high-pressure detection device 22 is arranged in the discharge passage of the compressor 10, and detects a pressure of the refrigerant discharged from the compressor 10. The high-pressure detection device 22 only needs to be, for example, a pressure sensor.

The low-pressure detection device 23 is arranged in a suction passage of the compressor 10, and detects a pressure of the refrigerant to be sucked into the compressor 10. The low-pressure detection device 23 only needs to be, for example, a thermistor.

The liquid refrigerant temperature detection device 24 is arranged in the refrigerant pipe located between the subcooling heat exchanger 13 and the outlet of the outdoor unit 1 during the cooling operation, and detects a temperature of refrigerant flowing through the arrangement location. The liquid refrigerant temperature detection device 24 only needs to be, for example, a thermistor.

The subcooling heat exchanger inlet refrigerant temperature detection device 25 is arranged in the first bypass pipe 4a located between the expansion device 14a and the subcooling heat exchanger 13, and detects a temperature of refrigerant flowing through the arrangement location. The subcooling heat exchanger inlet refrigerant temperature detection device 25 only needs to be, for example, a thermistor.

The subcooling heat exchanger outlet refrigerant temperature detection device 26 is arranged in the first bypass pipe 4a located between the subcooling heat exchanger 13 and the opening and closing device 19a, and detects a temperature of refrigerant flowing through the arrangement location. The subcooling heat exchanger outlet refrigerant temperature detection device 26 only needs to be, for example, a thermistor.

Further, the controller 50 is a microcomputer or the like and controls, based on the information pieces detected by the various detection devices and an instruction from a remote controller, the driving frequency of the compressor 10, the switching of the refrigerant flow switching device 11, the opening degrees of the expansion devices 14a to 14c, the rotation speed of the fan (not shown) arranged together with the heat source-side heat exchanger 12, the opening and closing switching of the opening and closing device 19a, the opening and closing switching of the opening and closing device 19b, and the like, to thereby execute each of the operation modes described later.

As described above, the compressor 10 has the injection port to which the second bypass pipe 4b is connected, thereby being capable of injecting, into the compression chamber of the compressor 10, the two-phase refrigerant having the second intermediate pressure lower than the first intermediate pressure through the reduction of the high pressure or the first intermediate pressure and also having high quality. Through the injection of the refrigerant in the two-phase state into the compression chamber of the compressor 10, a discharge temperature of the compressor 10 can be lowered, and hence the frequency of the compressor 10 can be increased. As a result, the heating capacity can be enhanced in the heating operation under low outside air temperature.

Further, during the heating operation, an enthalpy difference between the refrigerant at an outlet of the evaporator (heat source-side heat exchanger 12) and the refrigerant at an inlet thereof can be increased by a function of the subcooling heat exchanger 13, and hence the operation can be performed under a state in which the low pressure (suction pressure of the compressor 10) is high. As a result, the heating capacity can further be enhanced.

Moreover, the third bypass pipe 4c is also connected to the injection port of the compression chamber of the compressor 10, thereby being capable of injecting, into the compression chamber of the compressor 10, the two-phase refrigerant having the second intermediate pressure lower than the first intermediate pressure and also having low quality, which is obtained through the reduction of the high pressure or the first intermediate pressure. Through the injection of the refrigerant in the two-phase state into the compression chamber of the compressor 10, the discharge temperature of the compressor 10 can be lowered in a case of using a kind of refrigerant such as R32 that may cause increase in discharge temperature of the compressor 10.

The controller 50 controls the expansion device 14a, the expansion device 14b, the expansion device 14c, the opening and closing device 19a, the opening and closing device 19b, and the like, thereby being capable of controlling the flow rate and the presence or absence of injection of refrigerant to be injected to a suction side of the accumulator 15, the flow rate and the presence or absence of injection of refrigerant to be injected into the compression chamber of the compressor 10 through the second bypass pipe 4b, and the flow rate and the presence or absence of injection of refrigerant to be injected into the compression chamber of the compressor 10 through the third bypass pipe 4c. Note that, specific control operations are described in the description of operations of each of the operation modes to be given later.

Note that, the controller 50 controls respective actuators of the outdoor unit 1 based on the information pieces detected by the various detection devices and the instruction from the remote controller as described above. In addition to the control of the actuators described above, the controller 50 controls the driving frequency of the compressor 10, the rotation speed of the fan arranged together with the heat source-side heat exchanger 12 (including ON/OFF), the switching of the refrigerant flow switching device 11, and the like, to thereby execute each of the operation modes described later.

[Indoor Unit 2]

Each indoor unit 2 includes a use-side heat exchanger 17 and an expansion device 16 mounted in a serial connection therebetween. The use-side heat exchanger 17 is connected to the outdoor unit 1 by the extension pipes 5. The use-side heat exchanger 17 exchanges heat between air supplied from a fan (not shown) and a heat medium, to thereby generate heating air or cooling air to be supplied to the indoor space 7. The expansion device 16 functions as a pressure reducing valve or an expansion valve, and expands the refrigerant through decompression. The expansion device 16 only needs to be a device capable of variably controlling its opening degree, such as an electronic expansion valve.

FIG. 2 illustrates as an example a case where four indoor units 2 are connected, that is, FIG. 2 illustrates an indoor unit 2a, an indoor unit 2b, an indoor unit 2c, and an indoor unit 2d in the stated order from the bottom of the drawing sheet. Further, corresponding to the indoor units 2a to 2d, the respective use-side heat exchangers 17 are illustrated as a use-side heat exchanger 17a, a use-side heat exchanger 17b, a use-side heat exchanger 17c, and a use-side heat exchanger 17d in the stated order from the bottom of the drawing sheet as well. Moreover, corresponding to the indoor units 2a to 2d, the respective expansion devices 16 are illustrated as an expansion device 16a, an expansion device 16b, an expansion device 16c, and an expansion device 16d in the stated order from the bottom of the drawing sheet as well. Note that, similarly to FIG. 1, the number of the indoor units 2 to be connected is not limited to four as illustrated in FIG. 2.

Further, each indoor unit 2 includes various detection devices (use-side heat exchanger liquid refrigerant temperature detection device 27, use-side heat exchanger gas refrigerant temperature detection device 28, and use-side heat exchanger intermediate refrigerant temperature detection device 29). Information pieces detected by those detection devices (temperature information) are transmitted to a controller (not shown) arranged in the indoor unit 2, and are used for controlling actuators of the indoor unit 2. The controller is a microcomputer or the like and controls, based on the information pieces detected by the various detection devices and an instruction from the remote controller, a rotation speed of the fan (not shown) arranged together with the use-side heat exchanger 17, an opening degree of the expansion device 16, and the like, to thereby execute each of the operation modes described later in conjunction with the controller 50.

The use-side heat exchanger liquid refrigerant temperature detection device 27 is arranged in the refrigerant pipe located between the expansion device 16 and the use-side heat exchanger 17, and detects a temperature of refrigerant flowing through the arrangement location. The use-side heat exchanger liquid refrigerant temperature detection device 27 only needs to be, for example, a thermistor. Corresponding to the indoor units 2a to 2d, the respective use-side heat exchanger liquid refrigerant temperature detection devices 27 are illustrated as a use-side heat exchanger liquid refrigerant temperature detection device 27a, a use-side heat exchanger liquid refrigerant temperature detection device 27b, a use-side heat exchanger liquid refrigerant temperature detection device 27c, and a use-side heat exchanger liquid refrigerant temperature detection device 27d in the stated order from the bottom of the drawing sheet as well.

The use-side heat exchanger gas refrigerant temperature detection device 28 is arranged in an inlet or outlet of the use-side heat exchanger 17 on the opposite side to the use-side heat exchanger liquid refrigerant temperature detection device 27, and detects a temperature of refrigerant flowing through the arrangement location. The use-side heat exchanger gas refrigerant temperature detection device 28 only needs to be, for example, a thermistor. Corresponding to the indoor units 2a to 2d, the respective use-side heat exchanger gas refrigerant temperature detection devices 28 are illustrated as a use-side heat exchanger gas refrigerant temperature detection device 28a, a use-side heat exchanger gas refrigerant temperature detection device 28b, a use-side heat exchanger gas refrigerant temperature detection device 28c, and a use-side heat exchanger gas refrigerant temperature detection device 28d in the stated order from the bottom of the drawing sheet as well.

The use-side heat exchanger intermediate refrigerant temperature detection device 29 is arranged at an intermediate position in the use-side heat exchanger 17, and detects a temperature of refrigerant flowing through the arrangement location. The use-side heat exchanger intermediate refrigerant temperature detection device 29 only needs to be, for example, a thermistor. Corresponding to the indoor units 2a to 2d, the respective use-side heat exchanger intermediate refrigerant temperature detection devices 29 are illustrated as a use-side heat exchanger intermediate refrigerant temperature detection device 29a, a use-side heat exchanger intermediate refrigerant temperature detection device 29b, a use-side heat exchanger intermediate refrigerant temperature detection device 29c, and a use-side heat exchanger intermediate refrigerant temperature detection device 29d in the stated order from the bottom of the drawing sheet as well. Note that, the use-side heat exchanger intermediate refrigerant temperature detection device 29 need not be installed. A control operation to be performed when the use-side heat exchanger intermediate refrigerant temperature detection device 29 is installed and a control operation to be performed when the use-side heat exchanger intermediate refrigerant temperature detection device 29 is not installed are described later.

In the present Embodiment, the heat source-side heat exchanger 12 corresponds to a "first heat exchanger" of the present invention.

In the present Embodiment, the use-side heat exchangers 17 (17a to 17d) each correspond to a "second heat exchanger" of the present invention.

In the present Embodiment, the expansion devices 16 (16a to 16d) each correspond to a "first expansion device" of the present invention.

In the present Embodiment, the expansion device 14a corresponds to a "second expansion device" of the present invention.

In the present Embodiment, the expansion device 14b corresponds to a "third expansion device" of the present invention.

In the present Embodiment, the expansion device 14c corresponds to a "fourth expansion device" of the present invention.

Each of the operation modes to be executed by the air-conditioning apparatus 100 is described. The air-conditioning apparatus 100 determines the operation mode of the outdoor unit 1 as any one of a cooling operation mode and a heating operation mode based on an instruction from each indoor unit 2. That is, the air-conditioning apparatus 100 is capable of performing the same operation (cooling operation or heating operation) among all the indoor units 2 to adjust the indoor temperature. Note that, running and idling of each indoor unit 2 may be switched freely in any of the cooling operation mode and the heating operation mode.

The operation modes to be executed by the air-conditioning apparatus 100 include the cooling operation mode in which all the running indoor units 2 execute the cooling operation (including idling), and the heating operation mode in which all the running indoor units 2 execute the heating operation (including idling). Now, each of the operation modes is described with the flows of the refrigerant and the heat medium.

[Cooling Operation Mode]

Figure 3:
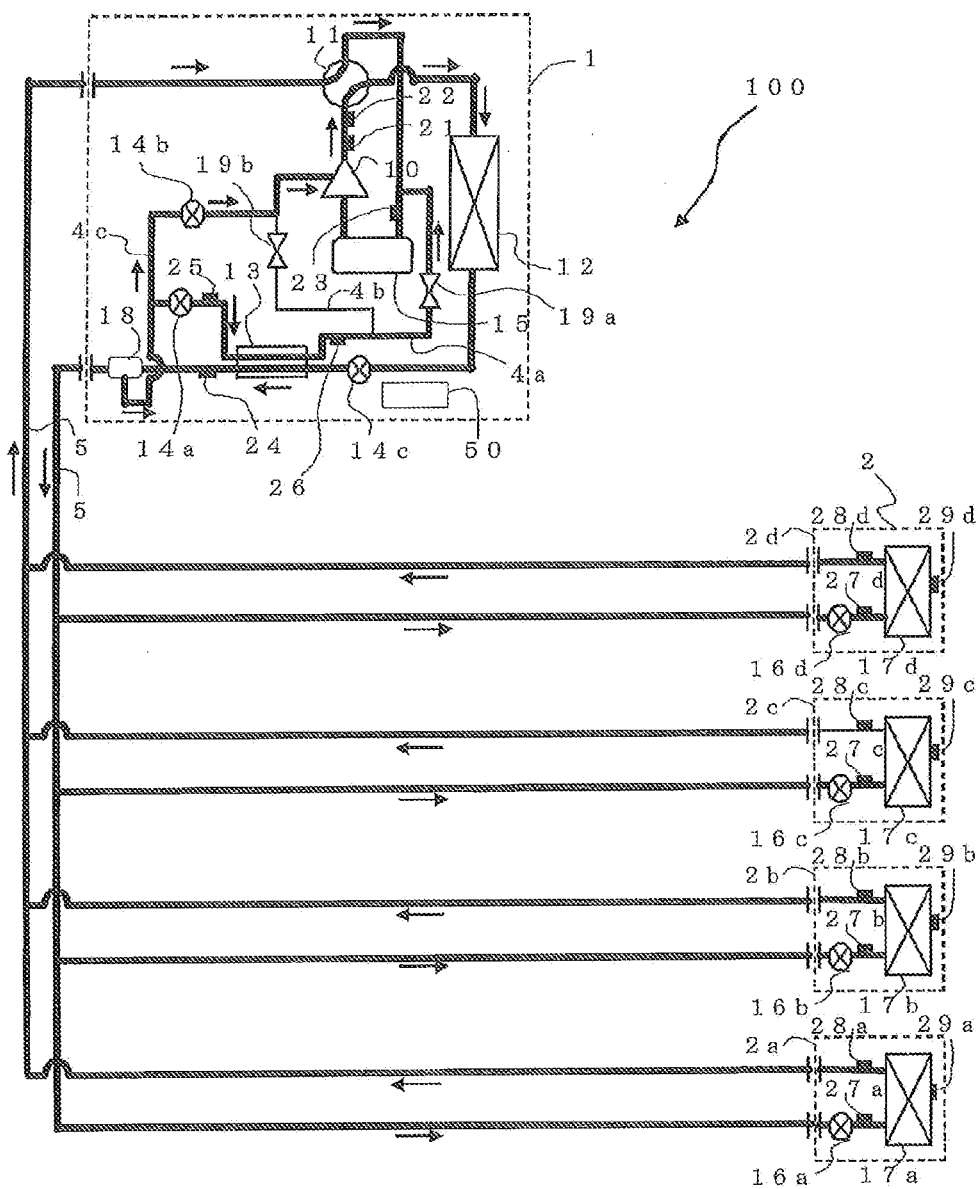
FIG. 3 is a system circuit diagram illustrating a flow of refrigerant and a heat medium during a cooling operation mode of the air-conditioning apparatus according to Embodiment 1 of the present invention.

FIG. 3 is a refrigerant circuit diagram illustrating the flow of the refrigerant during the cooling operation mode of the air-conditioning apparatus 100. In FIG. 3, the cooling operation mode is described taking as an example a case where a cooling load is generated in all the use-side heat exchangers 17. Note that, in FIG. 3, the pipes indicated by the thick lines are the pipes through which the refrigerant flows. A direction of the flow of the refrigerant is indicated by the solid arrows.

In the case of the cooling operation mode illustrated in FIG. 3, the refrigerant flow switching device 11 in the outdoor unit 1 is switched so that the refrigerant discharged from the compressor 10 flows into the heat source-side heat exchanger 12. The opening and closing device 19a is set to be opened and the opening and closing device 19b is set to be closed.

Low-temperature and low-pressure refrigerant is compressed by the compressor 10 and discharged from the compressor 10 as high-temperature and high-pressure gas refrigerant. The high-temperature and high-pressure gas refrigerant discharged from the compressor 10 flows into the heat source-side heat exchanger 12 through the refrigerant flow switching device 11. Then, the high-temperature and high-pressure gas refrigerant turns into high-pressure liquid refrigerant in the heat source-side heat exchanger 12 while being condensed and liquefied by rejecting heat to the outdoor air. The high-pressure liquid refrigerant flowing out of the heat source-side heat exchanger 12 passes through the expansion device 14c in a fully opened state and a first passage of the subcooling heat exchanger 13 (passage through which the refrigerant flowing through the refrigerant pipe is introduced).

The refrigerant passing through the first passage of the subcooling heat exchanger 13 is split into two passages by the liquid separator 18. One split refrigerant passes through the liquid separator 18 and flows out of the outdoor unit 1. The other split refrigerant flows into the first bypass pipe 4a through the third bypass pipe 4c. The refrigerant flowing into the first bypass pipe 4a flows into the expansion device 14a, in which the refrigerant is decompressed into low-temperature and low-pressure two-phase refrigerant. Then, the refrigerant passes through a second passage of the subcooling heat exchanger 13 (passage through which the refrigerant flowing through the first bypass pipe 4a is introduced). The refrigerant passing through the second passage joins the passage located on the upstream side of the accumulator 15 through the opening and closing device 19a in the opened state.

Note that, the subcooling heat exchanger 13 exchanges heat between the high-temperature refrigerant passing through the first passage and the low-temperature refrigerant passing through the second passage. That is, in the subcooling heat exchanger 13, the refrigerant passing through the first passage is cooled by the refrigerant passing through the second passage, whereas the refrigerant passing through the second passage is heated by the refrigerant passing through the first passage. Further, for example, the double-pipe heat exchanger is used as the subcooling heat exchanger 13 as described above, but the subcooling heat exchanger 13 is not limited to the double-pipe heat exchanger. The subcooling heat exchanger 13 may have any structure as long as the subcooling heat exchanger 13 is capable of exchanging heat between the refrigerant passing through the first passage and the refrigerant passing through the second passage.

The flow rate of the refrigerant passing through the first bypass pipe 4a is controlled based on the opening degree (opening area) of the expansion device 14a. The opening degree (opening area) of the expansion device 14a is controlled so that a temperature difference between a temperature detected by the subcooling heat exchanger outlet refrigerant temperature detection device 26 and a temperature detected by the subcooling heat exchanger inlet refrigerant temperature detection device 25, that is, a temperature difference (degree of superheat) between the front and back of the subcooling heat exchanger 13 at the second passage of the subcooling heat exchanger 13 approximates a target value. Note that, the opening degree (opening area) of the expansion device 14a may be controlled so that a degree of subcooling on a downstream side of the first passage of the subcooling heat exchanger 13 approximates a target value.

The high-temperature and high-pressure liquid refrigerant flowing out of the outdoor unit 1 passes through the extension pipe 5 to flow into each of the indoor units 2 (2a to 2d). The high-temperature and high-pressure liquid refrigerant flowing into the indoor unit 2 is expanded into low-temperature and low-pressure two-phase refrigerant by the expansion device 16 (16a to 16d), and flows into each use-side heat exchanger 17 (17a to 17d) functioning as an evaporator. The refrigerant flowing into the use-side heat exchanger 17 takes away heat from air flowing around the use-side heat exchanger 17 to turn into low-temperature and low-pressure gas refrigerant. Then, the low-temperature and low-pressure gas refrigerant flows out of the indoor unit 2, and passes through the extension pipe 5 to flow into the outdoor unit 1 again. Then, the refrigerant passes through the refrigerant flow switching device 11 to join the refrigerant that is controlled to flow through the first bypass pipe 4a so as to be bypassed to the upstream side of the accumulator 15. After that, the refrigerant flows into the accumulator 15, and is then sucked into the compressor 10 again.

At this time, the opening degree (opening area) of each of the expansion devices 16a to 16d is controlled so that a temperature difference (degree of superheat) between a temperature detected by the use-side heat exchanger gas refrigerant temperature detection device 28 and the temperature detected by the use-side heat exchanger liquid refrigerant temperature detection device 27 approximates a target value.

Note that, the subcooling heat exchanger 13 is provided so as to keep refrigerant subcooled reliably when the extension pipe 5 is long (for example, 100 m). When the extension pipe 5 is long, pressure loss is increased in the extension pipe 5, and hence refrigerant with a small degree of subcooling may be turned into two-phase refrigerant before reaching the indoor unit 2. When the two-phase refrigerant flows into the indoor unit 2, the two-phase refrigerant then flows into the expansion device 16. The expansion device has such a characteristic that noise is generated around the expansion device when the two-phase refrigerant flows into the expansion device. The expansion device 16 is arranged inside the indoor unit 2 for blowing temperature-adjusted air to the indoor space 7, and hence the generated noise may be leaked to the indoor space 7, thereby causing discomfort of residents.

Further, when the two-phase refrigerant flows into the expansion device 16, the control of the expansion device 16 becomes unstable. Therefore, it is necessary that refrigerant in a liquid state, which is subcooled reliably, be controlled to flow into the expansion device 16. For this reason, the subcooling heat exchanger 13 is provided. The expansion device 14a is arranged in the first bypass pipe 4a. When the opening degree (opening area) of the expansion device 14a is increased so as to increase the flow rate of the low-temperature and low-pressure two-phase refrigerant flowing into the second passage of the subcooling heat exchanger 13, the degree of subcooling of the refrigerant at an outlet of the first passage of the subcooling heat exchanger 13 is increased. When the opening degree (opening area) of the expansion device 14a is reduced so as to reduce the flow rate of the low-temperature and low-pressure two-phase refrigerant flowing into the second passage of the subcooling heat exchanger 13, on the other hand, the degree of subcooling of the refrigerant at the outlet of the first passage of the subcooling heat exchanger 13 is reduced.

That is, through the adjustment of the opening degree (opening area) of the expansion device 14a, the degree of subcooling of the refrigerant at the outlet of the first passage of the subcooling heat exchanger 13 can be controlled to an appropriate value. In order to prevent, from the viewpoint of reliability, the compressor 10 during a normal operation from sucking refrigerant having low quality due to the mixture of a large amount of liquid refrigerant, however, the first bypass pipe 4a is connected to the inlet side (upstream side) of the accumulator 15. The accumulator 15 is provided so as to accumulate surplus refrigerant therein. A majority of the refrigerant bypassed to the inlet side (upstream side) of the accumulator 15 through the first bypass pipe 4a is accumulated inside the accumulator 15, thereby being capable of preventing a large amount of liquid refrigerant from flowing back to the compressor 10.

The basic movement of refrigerant in the cooling operation mode is described above. When a refrigerant such as R32 that may cause increase in discharge temperature of the compressor 10 as compared to R410A is used as the refrigerant, the discharge temperature is required to be lowered in order to prevent deterioration of refrigerating machine oil and burnout of the compressor 10. Therefore, in the air-conditioning apparatus 100, a part of the liquid refrigerant is split from the liquid separator 18 and controlled to flow into the third bypass pipe 4c. The refrigerant flowing into the third bypass pipe 4c is decompressed into two-phase refrigerant by the expansion device 14b, and then flows into the compression chamber of the compressor 10 through the third bypass pipe 4c and the injection port formed in the compressor 10. With this configuration, a temperature of the refrigerant to be discharged from the compressor 10 can be lowered. As a result, the refrigerant can be used safely.

Note that, the third bypass pipe 4c is connected to the injection port formed in the compression chamber of the compressor 10 as described above. The refrigerant is injected into the compression chamber of the compressor 10 from the injection port formed in the compression chamber, thereby being capable of directly introducing, into the compressor, two-phase refrigerant with a large amount of liquid contained therein. The accumulator 15 is provided so as to accumulate surplus refrigerant therein. As in the first bypass pipe 4a, a majority of the refrigerant bypassed to the inlet side (upstream side) of the accumulator 15 is accumulated inside the accumulator 15, and hence only a part of the refrigerant flows into the compressor 10. When the discharge temperature of the compressor 10 is increased, however, the discharge temperature of the compressor 10 is required to be lowered, thereby being necessary to inject refrigerant liquid into the compression chamber of the compressor 10.

In view of the above, in the air-conditioning apparatus 100, the third bypass pipe 4c is connected to the injection port formed in the compression chamber of the compressor 10. Further, the flow rate of the refrigerant passing through the third bypass pipe 4c is controlled based on the opening degree (opening area) of the expansion device 14b. When the opening degree (opening area) of the expansion device 14b is increased so as to increase the flow rate of the refrigerant flowing through the third bypass pipe 4c, the discharge temperature of the compressor 10 is lowered. When the opening degree (opening area) of the expansion device 14b is reduced so as to reduce the flow rate of the refrigerant flowing through the third bypass pipe 4c, on the other hand, the discharge temperature of the compressor 10 is increased (raised). Therefore, through the adjustment of the opening degree (opening area) of the expansion device 14b, the discharge temperature, which is a detection value of the discharge refrigerant temperature detection device 21, can be set approximate to a target value.

The injection through the third bypass pipe 4c is performed when the discharge temperature is high. Therefore, in the cooling operation mode, under a state in which a temperature around the heat source-side heat exchanger 12 (outside air temperature) is high, the high pressure is increased and the discharge temperature is also increased. Accordingly, the discharge temperature is lowered by the injection through the third bypass pipe 4c, resulting in a state in which refrigerant is controlled to flow through the first bypass pipe 4a and the injection through the third bypass pipe 4c is also performed. Under a state in which the outside air temperature is low, on the other hand, the discharge temperature of the refrigerant to be discharged from the compressor 10 is not increased, and hence the injection through the third bypass pipe 4c is unnecessary. Therefore, the expansion device 14b is fully closed or set at a small opening degree for preventing the flow of refrigerant so that the injection through the third bypass pipe 4c does not occur.

Figure 4:
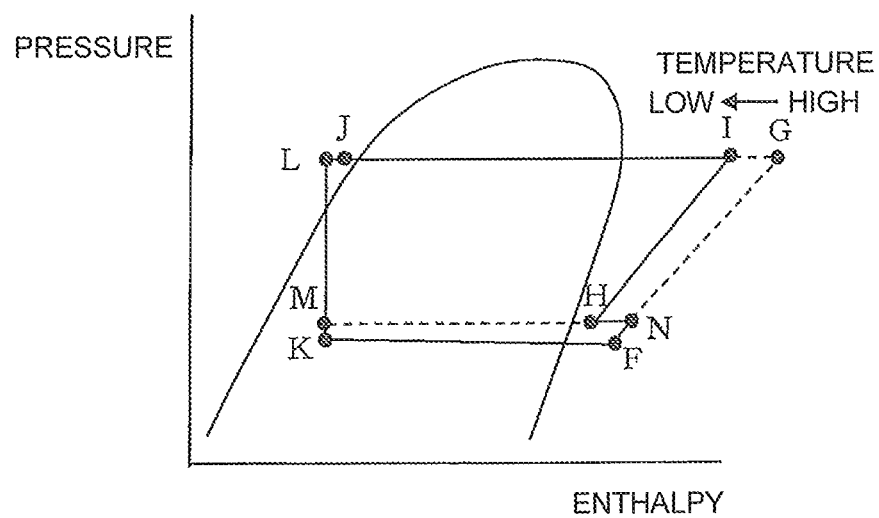
FIG. 4 is a p-h diagram (pressure-enthalpy diagram) during the cooling operation mode of the air-conditioning apparatus according to Embodiment 1 of the present invention.

Details of the operation of the injection are described referring to a p-h diagram (pressure-enthalpy diagram) of FIG. 4. FIG. 4 is a p-h diagram (pressure-enthalpy diagram) during the cooling operation mode of the air-conditioning apparatus 100.

In the cooling operation mode, refrigerant sucked into the compressor 10 and compressed by the compressor 10 (point I in FIG. 4) is condensed and liquefied into high-pressure liquid refrigerant by the heat source-side heat exchanger 12 (point J in FIG. 4). The high-pressure liquid refrigerant is cooled by the subcooling heat exchanger 13 with refrigerant split into the first bypass pipe 4a so that the degree of subcooling is increased (point L in FIG. 4). Then, the cooled refrigerant flows into the liquid separator 18. A part of the liquid refrigerant split into the third bypass pipe 4c by the liquid separator 18 is decompressed by the expansion device 14b to have the second intermediate pressure (point M in FIG. 4). The refrigerant having the second intermediate pressure is injected into the compression chamber of the compressor 10 from the injection port formed in the compression chamber, to thereby join the refrigerant sucked into the compressor 10 and compressed up to the second intermediate pressure.

On the other hand, the high-pressure two-phase refrigerant passing through the liquid separator 18 flows out of the outdoor unit 1 and passes through the extension pipe 5 to flow into the indoor unit 2. The high-pressure two-phase refrigerant flowing into the indoor unit 2 is decompressed by the expansion device 16 (16a to 16d) (point K in FIG. 4) and evaporated by the use-side heat exchanger 17 (17a to 17d). The refrigerant flowing out of the use-side heat exchanger 17 flows out of the indoor unit 2 and passes through the extension pipe 5 to flow into the outdoor unit 1. The refrigerant flowing into the outdoor unit 1 passes through the refrigerant flow switching device 11 to join the refrigerant that is controlled to flow through the first bypass pipe 4a so as to be bypassed to the upstream side of the accumulator 15. After that, the refrigerant flows into the accumulator 15 (point F in FIG. 4).

Then, the refrigerant flowing out of the accumulator 15 is sucked into the compressor 10 and compressed up to the second intermediate pressure (point N in FIG. 4). Then, the refrigerant is cooled by joining the refrigerant injected through the third bypass pipe 4c (point H in FIG. 4).

When the compressor 10 is a low-pressure shell type compressor, sucked refrigerant and oil flow into a lower part of the compressor 10, and a motor is arranged at a middle part of the compressor 10. After high-temperature and high-pressure refrigerant compressed in a compression chamber is discharged into a discharge chamber defined inside a hermetic container, the refrigerant is discharged from an upper part of the compressor 10. Thus, the metal hermetic container of the compressor 10 has a part exposed to the high-temperature and high-pressure refrigerant and a part exposed to the low-temperature and low-pressure refrigerant, and hence a temperature of the hermetic container is an intermediate temperature between a temperature of the high-temperature and high-pressure refrigerant and a temperature of the low-temperature and low-pressure refrigerant. Further, a current flows through the motor, and hence the motor generates heat.

Thus, the low-temperature and low-pressure refrigerant sucked into the compressor 10 is heated by the hermetic container and the motor of the compressor 10, and is sucked into the compression chamber after the temperature is raised (point F in FIG. 4). When the refrigerant is injected into the compression chamber of the compressor 10, the gas refrigerant sucked into the compressor 10 and compressed up to the second intermediate pressure (point N in FIG. 4) is then cooled by joining the two-phase refrigerant injected into the compression chamber. Therefore, the refrigerant has a lower temperature than in the case where the injection is not performed (point H in FIG. 4). Then, the refrigerant continues to be further compressed into high-pressure gas refrigerant.

Therefore, when the injection is performed, the discharge temperature of the refrigerant to be discharged from the compressor 10 is also lowered (point I in FIG. 4). In this case, the discharge temperature is lower than the discharge temperature of the compressor 10 in the case where the injection is not performed (point G in FIG. 4). Through this operation, the discharge temperature of the compressor 10 can be lowered in the case of using, for example, a kind of refrigerant such as R32 that may cause increase in discharge temperature of the compressor 10. As a result, the refrigerant can be used safely.

Note that, in the p-h diagram of FIG. 4 or the like according to the present Embodiment, the refrigerant obtained after the refrigerant compressed up to the second intermediate pressure in the compression chamber of the compressor 10 and the refrigerant injected through the third bypass pipe 4c are joined to each other (point H in FIG. 4) appears to be superheated gas refrigerant, but the position of the point H is determined based on a relationship between internal energy of the refrigerant compressed up to the second intermediate pressure in the compression chamber (product of the flow rate and the enthalpy (point N)) and internal energy of the refrigerant passing through the second bypass pipe 4b (product of the flow rate and the enthalpy (point M)). When the flow rate of the refrigerant passing through the third bypass pipe 4c is small, the refrigerant is brought into a superheated gas state, and when the flow rate of the refrigerant passing through the third bypass pipe 4c is large, the refrigerant is brought into a two-phase state. In actuality, the position of the injection port of the compression chamber is determined in many cases so that the value of the second intermediate pressure approximates the value of the low pressure. In those cases, the two-phase refrigerant is obtained at the point H only by controlling a small amount of refrigerant to flow into the third bypass pipe 4c. Mostly, the second intermediate-pressure refrigerant in the two-phase state is compressed in the compression chamber again.

Note that, it is desired that the expansion device 14a be a device capable of changing its opening area, such as an electronic expansion valve. When the electronic expansion valve is used, the flow rate of the refrigerant passing through the second passage of the subcooling heat exchanger 13 can be controlled arbitrarily, thereby enhancing controllability of the degree of subcooling of the refrigerant flowing out of the outdoor unit 1. However, the expansion device 14a is not limited to the electronic expansion valve, but may be a combination of ON/OFF valves such as small-size solenoid valves to select the opening area in a plurality of levels, or may be a capillary tube to set the degree of subcooling depending on the pressure loss of refrigerant. Also in those cases, the degree of subcooling can be controlled to a target value though the controllability is degraded slightly.

Further, the expansion device 14b is a device capable of changing its opening area, such as an electronic expansion valve. The opening area of the expansion device 14b is controlled so that the discharge temperature of the compressor 10, which is detected by the discharge refrigerant temperature detection device 21, is not excessively increased.

Further, the opening and closing device 19a and the opening and closing device 19b open and close the respective passages, and a solenoid valve or the like is used therefor. However, the opening and closing device 19a and the opening and closing device 19b are not limited to the solenoid valve, but may be an electronic expansion valve capable of closing the passage and adjusting the opening degree (opening area), or may be any device as long as the device is capable of opening and closing the passage. The same configurations of the opening and closing device 19a and the opening and closing device 19b apply to the heating operation mode described later.

Further, both of the expansion device 14a and the expansion device 14b are connected to liquid extraction pipes (first bypass pipe 4a and third bypass pipe 4c) of the same liquid separator 18. When two-phase refrigerant is controlled to flow into the expansion device, the operation becomes unstable and refrigerant noise is generated, thereby being necessary to control liquid refrigerant to flow into the expansion device. Therefore, liquid refrigerant separated by the liquid separator 18 is controlled to flow into the expansion device. At this time, two liquid separators 18 may be installed to control the liquid refrigerant extracted therefrom to flow into the expansion device 14a and the expansion device 14b, respectively. When the pipes are connected so that liquid may be split after being extracted from a single liquid separator 18, and the liquid refrigerant may be supplied to both of the expansion device 14a and the expansion device 14b, however, the system can be constructed at low cost.

When the cooling operation mode is executed, the refrigerant is not required to be controlled to flow into the use-side heat exchanger 17 without a heat load (including a thermostat-off state), and hence the operation is stopped. At this time, the expansion device 16 corresponding to the idle indoor unit 2 is fully closed or set at a small opening degree for preventing the flow of refrigerant.

As described above, the air-conditioning apparatus 100 includes the first bypass pipe 4a and the third bypass pipe 4c in the refrigerant circuit. The first bypass pipe 4a where the refrigerant separated by the liquid separator 18 flows through the subcooling heat exchanger 13 and the expansion device 14a is connected to the passage on the upstream side of the accumulator 15, and the third bypass pipe 4c where the refrigerant separated by the liquid separator 18 and controlled in flow rate by the expansion device 14b flows without passing through the subcooling heat exchanger 13 is connected to the injection port formed in the compression chamber of the compressor 10.

With this configuration, the air-conditioning apparatus 100 can separately perform the adjustment of the degree of subcooling of the refrigerant flowing out of the outdoor unit 1 and the control of the discharge temperature through the adjustment of the amount of injection to the compression chamber of the compressor 10. Thus, even when the extension pipe 5 is long, the refrigerant flowing into the indoor unit 2 can be brought into a state in which the degree of subcooling is secured reliably. In addition, under the condition that the discharge temperature of the compressor 10 may be increased, the air-conditioning apparatus 100 can reliably control the discharge temperature of the compressor 10 so as not to exceed the upper limit.

[Heating Operation Mode]

Figure 5:
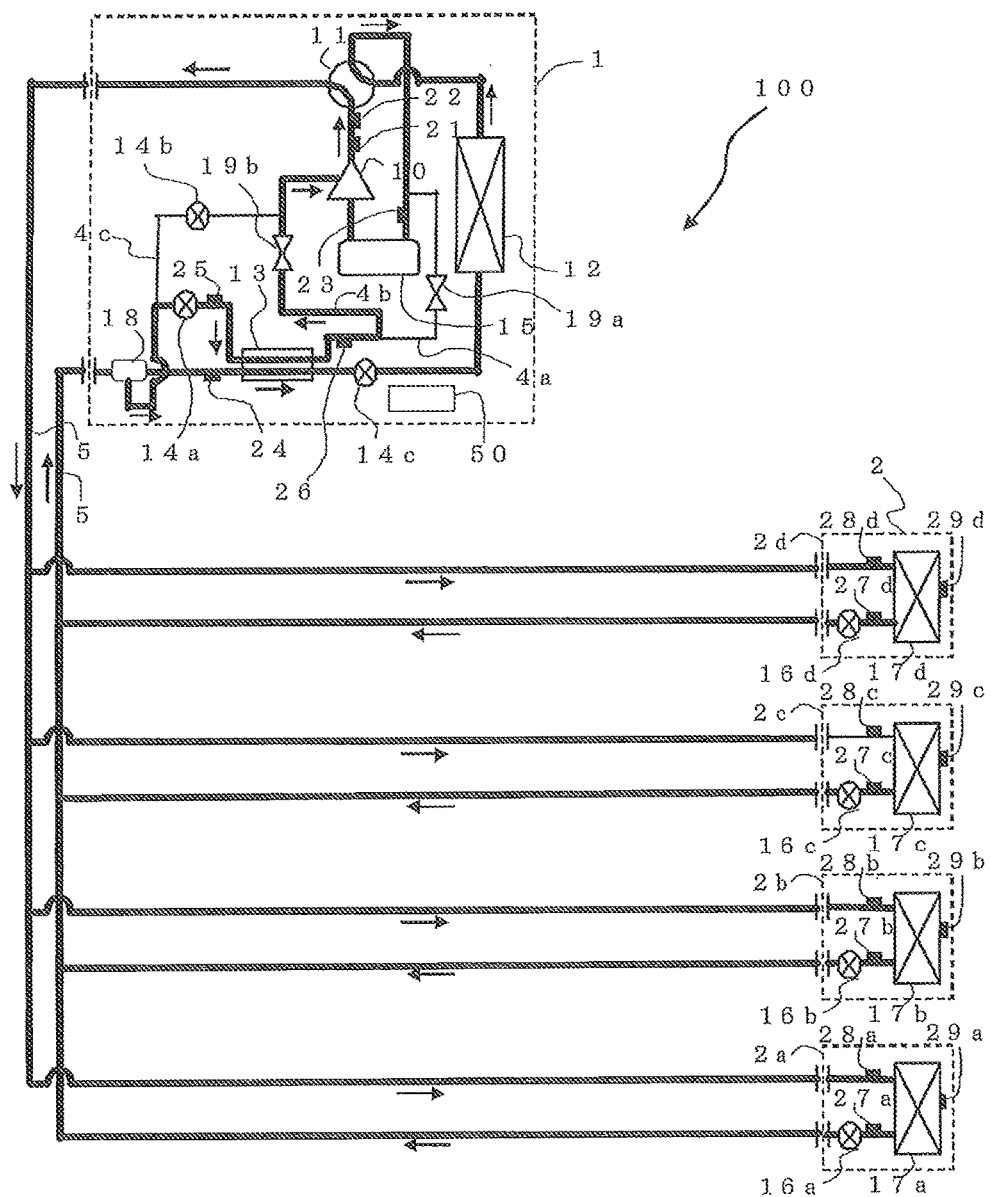
FIG. 5 is a system circuit diagram illustrating a flow of the refrigerant and the heat medium during a heating operation mode of the air-conditioning apparatus according to Embodiment 1 of the present invention.

FIG. 5 is a refrigerant circuit diagram illustrating a flow of refrigerant during the heating operation mode of the air-conditioning apparatus 100. In FIG. 5, the heating operation mode is described taking as an example a case where a heating load is generated in all of the use-side heat exchangers 17. Note that, in FIG. 5, the pipes indicated by the thick lines are the pipes through which the refrigerant flows, and directions of the flows of refrigerant are indicated by the solid arrows.

In the case of the heating operation mode illustrated in FIG. 5, the refrigerant flow switching device 11 in the outdoor unit 1 is switched so that the refrigerant discharged from the compressor 10 is controlled to flow into the indoor unit 2 without passing through the heat source-side heat exchanger 12. The opening and closing device 19a is closed, whereas the opening and closing device 19b is opened when the injection is performed, and is closed when the injection is not performed.

Low-temperature and low-pressure refrigerant is compressed into high-temperature and high-pressure gas refrigerant by the compressor 10 and discharged from the compressor 10. The high-temperature and high-pressure gas refrigerant discharged from the compressor 10 passes through the refrigerant flow switching device 11 to flow out of the outdoor unit 1. The high-temperature and high-pressure gas refrigerant flowing out of the outdoor unit 1 passes through the extension pipe 5 to flow into each of the indoor units 2 (2a to 2d). The high-temperature and high-pressure gas refrigerant flowing into the indoor unit 2 flows into each use-side heat exchanger 17 (17a to 17d), and is condensed and liquefied into high-temperature and high-pressure liquid refrigerant while rejecting heat to air flowing around the use-side heat exchanger 17. The liquid refrigerant flowing out of the use-side heat exchanger 17 is expanded into first intermediate-pressure two-phase refrigerant by the expansion device 16 (16a to 16d), and flows out of the indoor unit 2. The first intermediate-pressure two-phase refrigerant flowing out of the indoor unit 2 passes through the extension pipe 5 to flow into the outdoor unit 1 again.

At this time, the opening degree (opening area) of each of the expansion devices 16a to 16d is controlled so that a temperature difference (degree of subcooling) between a temperature detected by the use-side heat exchanger intermediate refrigerant temperature detection device 29 and the temperature detected by the use-side heat exchanger liquid refrigerant temperature detection device 27 approximates a target value. Note that, the use-side heat exchanger intermediate refrigerant temperature detection device 29 is not always required and need not be installed as described above. When the use-side heat exchanger intermediate refrigerant temperature detection device 29 is not installed, the controller 50 installed in the outdoor unit 1 determines the condensing temperature by converting the high pressure, which is a pressure detected by the high-pressure detection device 22, into a saturation temperature. Then, the determined condensing temperature is transmitted from the controller 50 of the outdoor unit 1 to the controller (not shown) arranged in the indoor unit 2 through communication, and the controller of the indoor unit 2 controls the expansion device 16 so that a temperature difference (degree of subcooling) between the received condensing temperature and the temperature detected by the use-side heat exchanger liquid refrigerant temperature detection device 27 approximates the target value.

A part of the liquid refrigerant is separated by the liquid separator 18 from the first intermediate-pressure two-phase refrigerant flowing into the outdoor unit 1. The first intermediate-pressure two-phase refrigerant remaining after the separation of the part of the liquid refrigerant passes through the first passage of the subcooling heat exchanger 13, and is expanded into low-temperature and low-pressure two-phase refrigerant through the expansion device 14c. Then, the refrigerant flows into the heat source-side heat exchanger 12. The low-temperature and low-pressure two-phase refrigerant flowing into the heat source-side heat exchanger 12 takes away heat from air flowing around the heat source-side heat exchanger 12 to evaporate into low-temperature and low-pressure gas refrigerant. The refrigerant is sucked into the compressor 10 again through the refrigerant flow switching device 11 and the accumulator 15.

Further, the liquid refrigerant separated by the liquid separator 18 is decompressed into second intermediate-pressure two-phase refrigerant by the expansion device 14a. The second intermediate-pressure two-phase refrigerant passes through the second passage of the subcooling heat exchanger 13 to turn into two-phase refrigerant having high quality. The refrigerant is injected into the compression chamber from the injection port formed in the compression chamber of the compressor 10 through the second bypass pipe 4b and the opening and closing device 19b in an opened state.

Note that, the second bypass pipe 4b is connected to the injection port formed in the compression chamber of the compressor 10. Through the injection of the refrigerant into the compression chamber from the injection port formed in the compression chamber of the compressor 10, the two-phase refrigerant containing liquid can be introduced directly into the compressor 10. When the refrigerant is bypassed to the inlet side (upstream side) of the accumulator 15, a majority of the refrigerant is accumulated inside the accumulator 15, and hence only a part of the refrigerant flows into the compressor 10.

When the discharge temperature of the compressor 10 is increased, however, the discharge temperature of the compressor 10 is required to be lowered. Therefore, the second bypass pipe 4b is connected to the injection port formed in the compression chamber of the compressor 10, to thereby inject refrigerant liquid into the compression chamber of the compressor 10. Further, the flow rate of the refrigerant passing through the second bypass pipe 4b is controlled based on the opening degree (opening area) of the expansion device 14a. When the opening degree (opening area) of the expansion device 14a is increased so as to increase the flow rate of the refrigerant flowing through the second bypass pipe 4b, the discharge temperature of the compressor 10 is lowered. When the opening degree (opening area) of the expansion device 14a is reduced so as to reduce the flow rate of the refrigerant flowing through the second bypass pipe 4b, on the other hand, the discharge temperature of the compressor 10 is increased. Therefore, through the adjustment of the opening degree (opening area) of the expansion device 14a, the discharge temperature of the compressor 10 can be changed. Note that, during the heating operation, the discharge temperature may be controlled, but the degree of discharge superheat is controlled in many cases. This is because, when the injection is performed through the subcooling heat exchanger 13, the control of the degree of discharge superheat allows a larger amount of refrigerant injection than the control of the discharge temperature, thereby enhancing the heating capacity during low-temperature heating. When the injection amount is excessively increased during the cooling, on the other hand, the flow rate of the refrigerant flowing into the evaporator is reduced, resulting in degradation of the cooling capacity. Therefore, the control of the discharge temperature is desired from the fact that the injection amount can be reduced. The control of the degree of discharge superheat is described later.

The basic movement of refrigerant in the heating operation mode is described above. The two-phase refrigerant having high quality is injected into the compression chamber of the compressor 10 through the second bypass pipe 4b. With this configuration, the discharge temperature of the compressor 10 is lowered, and hence the frequency of the compressor 10 can be increased. As a result, the heating capacity can be enhanced during, for example, the heating operation under low outside air temperature. Further, in the subcooling heat exchanger 13, the refrigerant flowing into the heat source-side heat exchanger 12 can be cooled by the refrigerant flowing through the second bypass pipe 4b, thereby being capable of increasing the difference between the enthalpy of the refrigerant at the outlet of the evaporator (heat source-side heat exchanger 12) and the enthalpy of the refrigerant at the inlet thereof. Therefore, the low pressure of the compressor 10 can be maintained at a relatively higher value, with the result that the heating capacity can further be enhanced.

Thus, during the heating operation, the air-conditioning apparatus 100 injects the refrigerant into the compressor 10 by using, instead of the third bypass pipe 4c, the second bypass pipe 4b where the subcooling heat exchanger 13 is arranged. Alternatively, under an operation state in which the discharge temperature is excessively high with the heating capacity being sufficiently high, the third bypass pipe 4c may be used to inject the refrigerant to the compressor 10.

In this case, the expansion device 14c functions to control a pressure of the refrigerant between the expansion device 16 and the expansion device 14a to the first intermediate pressure. When the pressure of the refrigerant between the expansion device 16 and the expansion device 14c, that is, the refrigerant inside the liquid separator 18 is maintained to be the first intermediate pressure, a pressure difference between the front and back of the second bypass pipe 4b can be secured, thereby being capable of reliably injecting the refrigerant into the compression chamber of the compressor 10. Note that, the opening degree (opening area) of the expansion device 14c is controlled so that the first intermediate pressure determined by converting the temperature detected by the liquid refrigerant temperature detection device 24 into a saturation pressure approximates a target value.

Further, in the heating operation mode, in a case of, for example, low-outside air heating in which the temperature around the heat source-side heat exchanger 12 (outside air temperature) is low, the low pressure is reduced and the discharge temperature is increased. Accordingly, the injection through the second bypass pipe 4b is necessary. In the heating operation under high outside air temperature, the injection through the second bypass pipe 4b is unnecessary. Therefore, the expansion device 14a is fully closed or set at a small opening degree for preventing the flow of refrigerant, or the opening and closing device 19b is closed so that the injection through the second bypass pipe 4b does not occur. Note that, when the injection is not performed, the passage of the second bypass pipe 4b may be closed by the expansion device 14a instead of the opening and closing device 19b.

Figure 6:
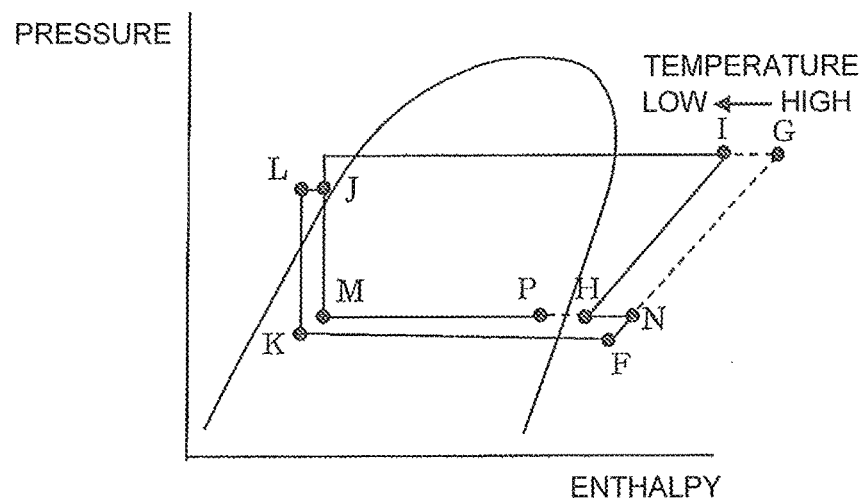
FIG. 6 is a p-h diagram (pressure-enthalpy diagram) during the heating operation mode of the air-conditioning apparatus according to Embodiment 1 of the present invention.

Details of the operation of the injection are described referring to a p-h diagram (pressure-enthalpy diagram) of FIG. 6. FIG. 6 is a p-h diagram (pressure-enthalpy diagram) during the heating operation mode of the air-conditioning apparatus 100.

In the heating operation mode, refrigerant sucked into the compressor 10 and compressed by the compressor 10 (point I in FIG. 6) flows out of the outdoor unit 1 through the refrigerant flow switching device 11, and passes through the extension pipe 5 to flow into the indoor unit 2. The refrigerant flowing into the indoor unit 2 is condensed by the use-side heat exchanger 17, and then expanded by the expansion device 16. Then, the refrigerant flows back to the outdoor unit 1 through the extension pipe 5, and flows into the liquid separator 18. At this time, the pressure of the refrigerant on the upstream side of the expansion device 14c is controlled in a state of the first intermediate pressure by the function of the expansion device 14c (point J in FIG. 6).

In the two-phase refrigerant having the first intermediate pressure with use of the expansion device 14c, the liquid refrigerant split by the liquid separator 18 is decompressed into second intermediate-pressure two-phase refrigerant by the expansion device 14a (point M in FIG. 6). The second intermediate-pressure two-phase refrigerant flows through the second passage of the subcooling heat exchanger 13, and is heated by the first intermediate-pressure refrigerant flowing through the first passage of the subcooling heat exchanger 13 to turn into two-phase refrigerant having high quality (point P in FIG. 6). Then, the two-phase refrigerant is injected into the compression chamber from the injection port formed in the compression chamber of the compressor 10 through the second bypass pipe 4b.

On the other hand, the first intermediate-pressure refrigerant passing through the liquid separator 18 flows through the first passage of the subcooling heat exchanger 13, and is cooled by the second intermediate-pressure refrigerant flowing through the second passage of the subcooling heat exchanger 13 so that the enthalpy is reduced (point L in FIG. 6). Then, the refrigerant is decompressed into low-pressure two-phase refrigerant by the expansion device 14c (point K in FIG. 6), and is evaporated by the heat source-side heat exchanger 12. After that, the refrigerant flows into the accumulator 15 through the refrigerant flow switching device 11 (point F in FIG. 6). The refrigerant flowing out of the accumulator 15 is sucked into the compressor 10 and compressed up to the second intermediate pressure (point N in FIG. 6). Then, the refrigerant is cooled (point H in FIG. 6) by joining the refrigerant injected through the second bypass pipe 4b (point P in FIG. 6).

When the compressor 10 is a low-pressure shell type compressor, the metal hermetic container of the compressor 10 has a part exposed to the high-temperature and high-pressure discharge refrigerant and a part exposed to the low-temperature and low-pressure suction refrigerant, and hence the temperature of the hermetic container is an intermediate temperature between the temperature of the high-temperature and high-pressure discharge refrigerant and the temperature of the low-temperature and low-pressure suction refrigerant. Further, a current flows through the motor, and hence the motor generates heat. Thus, the low-temperature and low-pressure refrigerant sucked into the compressor 10 is heated by the hermetic container and the motor of the compressor 10, and is sucked into the compression chamber after the temperature is raised (when the injection is not performed, point F in FIG. 6). When the refrigerant is injected into the compression chamber of the compressor 10, on the other hand, the gas refrigerant sucked into the compressor 10 and compressed up to the second intermediate pressure (point N in FIG. 6) is cooled by joining the two-phase refrigerant injected into the compression chamber. Therefore, the refrigerant has a lower temperature than in the case where the injection is not performed (point H in FIG. 6). Then, the refrigerant continues to be further compressed into high-pressure gas refrigerant.

Thus, when the injection is performed, the discharge temperature of the refrigerant to be discharged from the compressor 10 is also lowered (point I in FIG. 6). In this case, the discharge temperature is lower than the discharge temperature of the compressor 10 in the case where the injection is not performed (point G in FIG. 6). Through this operation, the discharge temperature of the compressor 10 can be lowered for use during the heating operation under low outside air temperature. As a result, the refrigerant can be used safely.

Note that, it is desired that the expansion device 14c be a device capable of changing its opening area, such as an electronic expansion valve. When the electronic expansion valve is used, the first intermediate pressure on the upstream side of the expansion device 14c can be controlled to an arbitrary pressure, with the result that the control of the discharge temperature is stabilized. However, the expansion device 14c is not limited to the electronic expansion valve, but may be a combination of ON/OFF valves such as small-size solenoid valves to select the opening area in a plurality of levels, or may be a capillary tube to set the intermediate pressure depending on the pressure loss of refrigerant. Also in those cases, the discharge temperature can be controlled to a target value though the controllability is degraded slightly.

Further, the description is given of the case where the first intermediate pressure is determined by converting the temperature detected by the liquid refrigerant temperature detection device 24 into a saturation pressure. With this configuration, the system can be constructed at low cost. As a matter of course, the present invention is not limited to this configuration, but a pressure sensor may be used instead. Further, the expansion device 14a is a device capable of changing its opening area, such as an electronic expansion valve. The opening area of the expansion device 14a is controlled so that the degree of discharge superheat of the compressor 10, which is computed based on the temperature detected by the discharge refrigerant temperature detection device 21 and the pressure detected by the high-pressure detection device 22, falls within a target range.

Further, both of the first bypass pipe 4a and the second bypass pipe 4b are connected to the passage located opposite to the expansion device 14a across the subcooling heat exchanger 13, and the passage of the refrigerant flowing through the subcooling heat exchanger 13 is switched by the opening and closing device 19a and the opening and closing device 19b.

Two expansion devices 14a and two subcooling heat exchangers 13 may be installed to be connected to the first bypass pipe 4a and the second bypass pipe 4b, respectively. However, the flow passing through the first bypass pipe 4a is generated during the cooling operation, whereas the flow passing through the second bypass pipe 4b is generated during the heating operation. Thus, those flows are not generated at the same time. Therefore, when a set of the liquid separator 18, the expansion device 14a, and the subcooling heat exchanger 13 is used and the flow passing through the first bypass pipe 4a and the flow passing through the second bypass pipe 4b are switched by the opening and closing device 19a and the opening and closing device 19b, the system can be constructed at low cost. Note that, when two expansion devices 14a and two subcooling heat exchangers 13 are installed, two liquid separators 18 may be installed as well.

When the heating operation mode is executed, the refrigerant is not required to be controlled to flow into the use-side heat exchanger 17 without a heat load (including a thermostat-off state). When the expansion device 16 corresponding to the use-side heat exchanger 17 without a heat load is fully closed or set at a small opening degree for preventing the flow of refrigerant in the heating operation mode, however, the refrigerant is cooled and condensed inside the idle use-side heat exchanger 17 by ambient air so that the refrigerant may stagnate, resulting in shortage of refrigerant in the entire refrigerant circuit. Therefore, during the heating operation, the opening degree (opening area) of the expansion device 16 corresponding to the use-side heat exchanger 17 without a heat load is set to a large opening degree to achieve a fully-opened state or the like, thereby preventing the stagnation of refrigerant.

Figure 7:
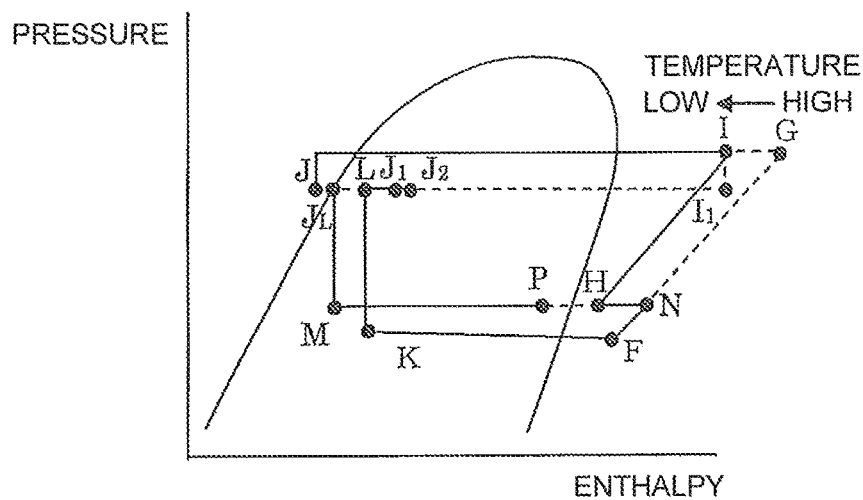
FIG. 7 is a p-h diagram (pressure-enthalpy diagram) in a case where an idle indoor unit 2 exists during the heating operation mode of the air-conditioning apparatus according to Embodiment 1 of the present invention.

Note that, in a case where an idle indoor unit 2 exists, a flow of refrigerant passing through the idle indoor unit 2 is generated due to the control of the expansion device 16 as described above. At this time, the refrigerant is not condensed in the use-side heat exchanger 17 without a heat load, and hence the corresponding expansion device 16 decompresses the high-temperature and high-pressure gas refrigerant. As a result, the p-h diagram (pressure-enthalpy diagram) differs from that described above. An operation to be performed in this case is described referring to a p-h diagram (pressure-enthalpy diagram) of FIG. 7. FIG. 7 is a p-h diagram (pressure-enthalpy diagram) in the case where an idle indoor unit 2 exists during the heating operation mode of the air-conditioning apparatus 100.

In the heating operation mode in the case where an idle indoor unit 2 exists, refrigerant sucked into the compressor 10 and compressed by the compressor 10 (point I in FIG. 7) flows out of the outdoor unit 1 through the refrigerant flow switching device 11, and passes through the extension pipe 5 to flow into the indoor unit 2. The refrigerant flowing into the indoor unit 2 is condensed by the use-side heat exchanger 17 with a heating load, and then expanded by the expansion device 16 to have the first intermediate pressure (point J in FIG. 7). Then, the refrigerant flows back to the outdoor unit 1 through the extension pipe 5.

On the other hand, in order to prevent the stagnation of refrigerant in the use-side heat exchanger 17, the refrigerant controlled to flow into the use-side heat exchanger 17 without a heat load passes through the use-side heat exchanger 17 while remaining as the gas refrigerant without being condensed. After that, the refrigerant is decompressed by the expansion device 16 to have the first intermediate pressure (point $I_1$ in FIG. 7). Then, the refrigerant flows back to the outdoor unit 1 through the extension pipe 5.

In the middle of the operation, the first intermediate-pressure liquid refrigerant obtained by condensing and expanding the refrigerant and the first intermediate-pressure gas refrigerant obtained by decompressing the refrigerant without being condensed are mixed with each other at a certain position in the extension pipe 5 to turn into first intermediate-pressure two-phase refrigerant (point $J_1$ in FIG. 7). Then, the first intermediate-pressure two-phase refrigerant flows into the liquid separator 18 of the outdoor unit 1. A part of the liquid refrigerant is split by a function of the liquid separator 18 from the first intermediate-pressure two-phase refrigerant flowing into the liquid separator 18 (point $J_L$ in FIG. 7). The split liquid refrigerant is decompressed by the expansion device 14a into two-phase refrigerant having the second intermediate pressure that is lower than the first intermediate pressure (point M in FIG. 7). Then, the refrigerant flows through the second passage of the subcooling heat exchanger 13, and is heated by the first intermediate-pressure refrigerant flowing through the first passage of the subcooling heat exchanger 13 to turn into two-phase refrigerant having high quality (point P in FIG. 7). Then, the refrigerant is introduced into the compression chamber of the compressor 10 from the injection port formed in the compressor through the second bypass pipe 4b.

On the other hand, the first intermediate-pressure refrigerant passing through the liquid separator 18 to have slightly higher quality (point $J_2$ in FIG. 7) flows through the first passage of the subcooling heat exchanger 13, and is cooled by the second intermediate-pressure refrigerant flowing through the second passage of the subcooling heat exchanger 13 so that the enthalpy is reduced (point L in FIG. 7). Then, the refrigerant is decompressed into low-pressure two-phase refrigerant by the expansion device 14c (point K in FIG. 7). After that, the refrigerant is evaporated by the heat source-side heat exchanger 12, and then flows into the accumulator 15 through the refrigerant flow switching device 11 (point F in FIG. 7). The refrigerant flowing out of the accumulator 15 is sucked into the compressor 10 and compressed up to the second intermediate pressure (point N in FIG. 7). Then, the refrigerant is cooled (point H in FIG. 7) by joining the refrigerant injected through the second bypass pipe 4b.

The flow rate of the refrigerant flowing through the expansion device varies depending on the density of the refrigerant even at the same opening degree (opening area). The two-phase refrigerant is a mixture of gas refrigerant having a small density and liquid refrigerant having a large density. When the refrigerant flowing into the expansion device is changed from the liquid refrigerant to the two-phase refrigerant, the density of the refrigerant is changed significantly. As a result, the opening degree (opening area) that achieves an appropriate flow rate for lowering the discharge temperature of the compressor 10 by a given amount varies significantly.

In this condition, the opening degree of the expansion device 14a needs to be changed significantly along with the start and stop of the indoor unit 2, with the result that stable control cannot be performed. Therefore, the liquid separator 18 is arranged in the air-conditioning apparatus 100 so that only refrigerant in a liquid state can be separated by the liquid separator 18 even in the case where an idle indoor unit 2 exists. Accordingly, only the liquid refrigerant can be controlled to flow into the expansion device 14a, with the result that stable control can be performed.

The opening degree (opening area) of the expansion device 14a is controlled so that the degree of discharge superheat of the compressor 10, which is computed based on the temperature detected by the discharge refrigerant temperature detection device 21 and the pressure detected by the high-pressure detection device 22, falls within the target range. An optimum value of the flow rate of the refrigerant to be injected varies depending on the outside air temperature, and hence, when the target value of the degree of discharge superheat is changed depending on the outside air temperature, the efficiency is enhanced. The control of the degree of discharge superheat can prevent excessive increase in discharge temperature. Note that, the target value of the degree of discharge superheat may be set to the same value without being changed depending on the outside air temperature. Further, the target value of the degree of discharge superheat may be set to a constant value of, for example, 40 degrees Celsius, or may be set within a target range of, for example, from 20 degrees Celsius to 40 degrees Celsius. Alternatively, the opening degree of the expansion device 14a may be controlled so that the discharge temperature corresponding to the temperature detected by the discharge refrigerant temperature detection device 21 equals a target value.

Further, a four-way valve is generally used for the refrigerant flow switching device 11, but the refrigerant flow switching device 11 is not limited thereto. A plurality of two-way passage switching valves or a plurality of three-way passage switching valves may be used so that the refrigerant flows in the same way.

Further, the case where four indoor units 2 are connected is described as an example, but it goes without saying that any number of the indoor units 2 may be connected and the same effect is achieved. Note that, in a case where only one indoor unit 2 is connected, no idle indoor unit exists during the heating operation, and hence the liquid separator 18 need not be installed.

Further, in a case where an ON/OFF valve for opening and closing a passage is arranged in the passage on the inlet side of each of the indoor units 2 during the heating operation and therefore the stagnation of refrigerant can be prevented in an idle indoor unit during the heating operation, the flow of the refrigerant passing through the idle indoor unit 2 is not generated, and hence the liquid separator 18 need not be installed.

Note that, any structure may be adopted for the liquid separator 18 as long as the liquid separator 18 has one inlet passage and two outlet passages and a part of the liquid refrigerant is separated from the refrigerant in the two-phase state, which flows in through the inlet passage, whereas the separated liquid refrigerant and the remaining two-phase refrigerant are controlled to flow out through the two outlet passages, respectively. Further, even when separation efficiency for the separation of the liquid refrigerant from the two-phase refrigerant is not 100% but some gas refrigerant is mixed into the liquid refrigerant in the passage for extracting the liquid refrigerant, the mixture may be allowed as long as the degree of gas refrigerant mixture is kept low enough to avoid a significant effect on the control of the expansion device. In addition, when the liquid separator 18 is installed on the upstream side of the subcooling heat exchanger 13 during the heating operation, the liquid separator 18 is not affected by the pressure loss in the first passage of the subcooling heat exchanger 13 during the heating operation. Thus, the accuracy of measurement of the first intermediate pressure with the liquid refrigerant temperature detection device 24 is enhanced, thereby enhancing the accuracy of control of the discharge temperature.

Further, even in a case where a plurality of outdoor units 1 are connected by pipes so that refrigerant circuits of the plurality of outdoor units 1 join each other at the outside of the outdoor units 1, the present invention is applied in the same way and the same effect is achieved.

Further, the case where the low-pressure shell type compressor is used as the compressor 10 is described as an example. As a matter of course, there may be used such a high-pressure shell type compressor that suction refrigerant is sucked directly into a compression chamber and the refrigerant compressed and discharged from the compression chamber is jetted into a hermetic container and then discharged from the compressor 10. With this configuration, the same effect is achieved.

Further, the air-conditioning apparatus of the type for switching the cooling and the heating is described as an example, but the air-conditioning apparatus is not limited thereto. Alternatively, there may be adopted an air-conditioning apparatus of a cooling and heating simultaneous type, in which a relay unit is arranged between the outdoor unit 1 and the indoor units 2, the refrigerant is circulated from the outdoor unit 1 to the indoor units 2 through the relay unit, and both the cooling energy and the heating energy are generated in the relay unit, thereby supplying cooled refrigerant to the indoor unit 2 to meet a demand for cooling, and supplying heated refrigerant to the indoor unit 2 to meet a demand for heating. With this configuration, the same effect is achieved by the same method.

Further, the air-conditioning apparatus in which the refrigerant is circulated from the outdoor unit 1 to the indoor units 2 is described as an example, but the air-conditioning apparatus is not limited thereto. Alternatively, there may be adopted an air-conditioning apparatus in which a relay unit is arranged between the outdoor unit 1 and the indoor units 2, the refrigerant is circulated between the outdoor unit 1 and the relay unit, heat is exchanged between the refrigerant and a heat medium such as water or brine in the relay unit, and the heat medium is circulated between the relay unit and the indoor units 2. With this configuration, the same effect is achieved by the same method. In addition, this type of air-conditioning apparatus may be an air-conditioning apparatus capable of generating only one of cold water or hot water in the relay unit, or an air-conditioning apparatus capable of generating both of the cold water and the hot water in the relay unit.

The effect is significant when a refrigerant such as R32 that may cause increase in discharge temperature is used as the refrigerant. In addition to R32, there may be used a refrigerant mixture of R32 and HFO1234yf or HFO1234ze, which is a tetrafluoropropene-based refrigerant having a low global warming potential and being represented by the chemical formula of $CF_3CF=CH_2$ (zeotropic refrigerant mixture). In the case where R32 is used as the refrigerant, the discharge temperature is raised by about 20 degrees Celsius under the same operation state as compared with the case where R410A is used. Therefore, R32 needs to be used while lowering the discharge temperature, and hence the suction injection is effective significantly. In the case where the refrigerant mixture of R32 and HFO1234yf is used and a mass fraction of R32 is 62% (62 wt %) or more, the discharge temperature is higher by 3 degrees Celsius or more than in the case where the R410A refrigerant is used. Therefore, the effect is significant when the discharge temperature is lowered through the suction injection.

Further, in the case where the refrigerant mixture of R32 and HFO1234ze is used and the mass fraction of R32 is 43% (43 wt %) or more, the discharge temperature is higher by 3 degrees Celsius or more than in the case where the R410A refrigerant is used. Therefore, the effect is significant when the discharge temperature is lowered through the suction injection. In addition, the kinds of refrigerant in the refrigerant mixture are not limited to those described above. Also in a case of a refrigerant mixture containing a small amount of other refrigerant components, the discharge temperature is not affected significantly so that the same effect is achieved. For example, a refrigerant mixture containing R32, HFO1234yf, and a small amount of other refrigerant components may also be used. The discharge temperature needs to be lowered in any refrigerant that may cause the discharge temperature to be higher than that of R410A. Thus, the same effect is achieved.

Further, the fans are generally mounted on the heat source-side heat exchanger 12 and the use-side heat exchangers 17a to 17d, and the condensation or evaporation is promoted by blowing air in many cases, but the present invention is not limited thereto. For example, panel heaters utilizing radiation or other such devices may be used as the use-side heat exchangers 17a to 17d, and a water-cooled device for transferring heat with water or an antifreeze solution may also be used as the heat source-side heat exchanger 12. Any devices may be used as long as the devices have a structure capable of rejecting or taking away heat.

As described above, the air-conditioning apparatus 100 is capable of preventing excessive increase in discharge temperature of the compressor 10 in both of the cooling operation and the heating operation. Therefore, according to the air-conditioning apparatus 100, it is possible to prevent damage to the compressor 10, extend the life of the compressor 10, and to exert required heating capacity in the heating operation under low outside air temperature.

REFERENCE SIGNS LIST 1 outdoor unit 2 indoor unit 2a indoor unit 2b indoor unit 2c indoor unit 2d indoor unit 4a first bypass pipe 4b second bypass pipe 4c third bypass pipe 5 extension pipe 6 outdoor space 7 indoor space 9 structure 10 compressor 11 refrigerant flow switching device 12 heat source-side heat exchanger 13 subcooling heat exchanger 14a expansion device 14b expansion device 14c expansion device 15 accumulator 16 expansion device 16a expansion device 16b expansion device 16c expansion device 16d expansion device 17 use-side heat exchanger 17a use-side heat exchanger 17b use-side heat exchanger 17c use-side heat exchanger 17d use-side heat exchanger 18 liquid separator 19a opening and closing device 19b opening and closing device 21 discharge refrigerant temperature detection device 22 high-pressure detection device 23 low-pressure detection device 24 liquid refrigerant temperature detection device 25 subcooling heat exchanger inlet refrigerant temperature detection device 26 subcooling heat exchanger outlet refrigerant temperature detection device 27 use-side heat exchanger liquid refrigerant temperature detection device 27a use-side heat exchanger liquid refrigerant temperature detection device 27b use-side heat exchanger liquid refrigerant temperature detection device 27c use-side heat exchanger liquid refrigerant temperature detection device 27d use-side heat exchanger liquid refrigerant temperature detection device 28 use-side heat exchanger gas refrigerant temperature detection device 28a use-side heat exchanger gas refrigerant temperature detection device 28b use-side heat exchanger gas refrigerant temperature detection device 28c use-side heat exchanger gas refrigerant temperature detection device 28d use-side heat exchanger gas refrigerant temperature detection device 29 use-side heat exchanger intermediate refrigerant temperature detection device 29a use-side heat exchanger intermediate refrigerant temperature detection device 29b use-side heat exchanger intermediate refrigerant temperature detection device 29c use-side heat exchanger intermediate refrigerant temperature detection device 29d use-side heat exchanger intermediate refrigerant temperature detection device 50 controller 100 air-conditioning apparatus

The invention claimed is:

1. An air-conditioning apparatus, comprising:
a refrigeration cycle for circulating refrigerant therethrough, in which a compressor, a first heat exchanger, a first passage of a subcooling heat exchanger for exchanging heat between high-temperature refrigerant and low-temperature refrigerant to subcool the high-temperature refrigerant, a first expansion device, and a second heat exchanger are connected to each other by refrigerant pipes,
the compressor including an injection port for introducing the refrigerant from outside into a compression chamber of the compressor;
a first bypass pipe branched from one of the refrigerant pipes between the first heat exchanger and the second heat exchanger and connected to an inlet-side passage of the compressor through a second expansion device, a second passage of the subcooling heat exchanger for exchanging heat between the refrigerant flowing through the second passage of the subcooling heat exchanger and the refrigerant flowing through the first passage of the subcooling heat exchanger, and a first opening and closing device;
a second bypass pipe branched from the first bypass pipe between the subcooling heat exchanger and the first opening and closing device and connected to the injection port of the compressor through a second opening and closing device;
a third bypass pipe branched from the one of the refrigerant pipes between the first heat exchanger and the second heat exchanger and connected to the injection port of the compressor through a third expansion device; and
a liquid separator arranged on a branch portion of the one of the refrigerant pipes between the first heat exchanger and the second heat exchanger and configured to extract a part of liquid refrigerant from the refrigerant flowing between the first heat exchanger and the second heat exchanger, wherein
the liquid separator includes an extraction port for the refrigerant in the liquid separator connected to the first bypass pipe and the third bypass pipe.

2. The air-conditioning apparatus of claim 1, further comprising an accumulator arranged on a suction side of the compressor,
wherein the first bypass pipe connects the one of the refrigerant pipes between the first heat exchanger and the second heat exchanger and an inlet-side passage of the accumulator.

3. The air-conditioning apparatus of claim 1, wherein the third bypass pipe connects the one of the refrigerant pipes between the first heat exchanger and the second heat exchanger and the second bypass pipe between the second opening and closing device and the injection port of the compressor.

4. The air-conditioning apparatus of claim 1, further comprising:
a discharge temperature detection device configured to detect a temperature of the refrigerant in an outlet-side passage of the compressor; and
a controller configured to adjust an opening degree of one of the second expansion device and an opening degree of the third expansion device to control either one of a flow rate of the refrigerant flowing through the second bypass pipe and a flow rate of the refrigerant flowing through the third bypass pipe, to thereby control either one of the discharge temperature corresponding to the temperature detected by the discharge temperature detection device and a value to be computed based on the discharge temperature,
wherein the refrigerant to be circulated through the refrigerant pipes includes refrigerant that causes a discharge temperature of the compressor to be higher than a discharge temperature when R410A is used.

5. The air-conditioning apparatus of claim 4, wherein, during a cooling operation to be performed by causing the first heat exchanger to function as a condenser and the second heat exchanger to function as an evaporator, the controller adjusts the opening degree of the third expansion device based on either one of the discharge temperature corresponding to the temperature detected by the discharge temperature detection device and the value to be computed based on the discharge temperature, to thereby control the flow rate of the refrigerant flowing through the third bypass pipe.

6. The air-conditioning apparatus of claim 5, wherein, at least when a temperature of air around the first heat exchanger to be subjected to heat exchange with the refrigerant in the first heat exchanger is high during the cooling operation, the controller controls the refrigerant to flow through the third bypass pipe as well as controlling the refrigerant to flow through the first bypass pipe.

7. The air-conditioning apparatus of claim 5, wherein, during the cooling operation, the controller adjusts the opening degree of the third expansion device, to thereby control the discharge temperature corresponding to the temperature detected by the discharge temperature detection device.

8. The air-conditioning apparatus of claim 4, further comprising a fourth expansion device arranged between the first heat exchanger and the first expansion device that is positioned on a downstream side of the second heat exchanger during a heating operation to be performed by causing the first heat exchanger to function as an evaporator and the second heat exchanger to function as a condenser,
wherein, during the heating operation, the controller adjusts the opening degree of the second expansion device, into which the refrigerant split from an upstream side of the fourth expansion device is controlled to flow, based on either one of the discharge temperature corresponding to the temperature detected by the discharge temperature detection device and the value to be computed based on the discharge temperature, to thereby control the flow rate of the refrigerant flowing through the second bypass pipe.

9. The air-conditioning apparatus of claim 8, wherein, at least when the temperature of the air around the first heat exchanger to be subjected to the heat exchange with the refrigerant in the first heat exchanger is low during the heating operation, the controller controls the refrigerant to flow through the second bypass pipe.

10. The air-conditioning apparatus of claim 8, further comprising a high-pressure detection device configured to detect a pressure of the refrigerant in the outlet-side passage of the compressor,
wherein, during the heating operation, the controller adjusts the opening degree of the second expansion device, to thereby control a degree of discharge superheat to be computed based on the discharge temperature and the pressure detected by the high-pressure detection device.

11. The air-conditioning apparatus of claim 4, wherein the refrigerant to be circulated through the refrigerant pipes includes one of R32 and a refrigerant mixture containing R32 at a ratio of 62% or more.

12. The air-conditioning apparatus of claim 1,
wherein the refrigerant to be circulated through the refrigerant pipes includes refrigerant that causes a discharge temperature of the compressor to be higher than a discharge temperature when R410A is used,
wherein a cooling operation is performed by causing the first heat exchanger to function as a condenser and the second heat exchanger to function as an evaporator,
wherein a heating operation is performed by causing the first heat exchanger to function as an evaporator and the second heat exchanger to function as a condenser, and
wherein the air-conditioning apparatus includes
a discharge temperature detection device configured to detect a temperature of the refrigerant in an outlet-side passage of the compressor,
a high-pressure detection device configured to detect a pressure in the outlet-side passage of the compressor, and
a controller configured to adjust, during the cooling operation, an opening degree of the third expansion device to control a flow rate of the refrigerant flowing through the third bypass pipe, to thereby control the discharge temperature corresponding to the temperature detected by the discharge temperature detection device, and adjust, during the heating operation, an opening degree of the second expansion device to control a flow rate of the refrigerant flowing through the second bypass pipe, to thereby control a degree of discharge superheat to be computed based on the discharge temperature and the pressure detected by the high-pressure detection device.

13. The air-conditioning apparatus of claim 1, wherein the compressor, the subcooling heat exchanger, the second expansion device, the third expansion device, the first heat exchanger, the first bypass pipe, the second bypass pipe, and the third bypass pipe are housed inside an outdoor unit.

14. The air-conditioning apparatus of claim 1, wherein the third bypass pipe is connected to both the first bypass pipe and the second bypass pipe.

* * * * *